United States Patent [19]

Riman et al.

[11] Patent Number: 5,628,945

[45] Date of Patent: May 13, 1997

[54] MULTICOMPONENT POWDER MIXING PROCESS AND COMPOSITIONS PRODUCED THEREBY

[76] Inventors: Richard E. Riman, 13 Whitehall Rd.; Paul R. Mort, III, 275 Hatfield La., both of East Brunswick, N.J. 08816

[21] Appl. No.: 925,719

[22] Filed: Aug. 3, 1992

[51] Int. Cl.[6] .................................. B01J 2/12; C03C 6/08
[52] U.S. Cl. .................. 264/117; 71/64.02; 71/64.05; 264/29.3; 264/113; 419/64; 419/65; 424/470; 501/29; 501/135; 514/951
[58] Field of Search .................. 252/183.11, 183.12, 252/183.13; 264/4.4, 7, 117, 113; 427/213.3, 213.31, 213.36, 222, 190, 193; 71/64.02, 64.05; 424/459, 470; 514/951; 521/919; 501/29, 135; 419/64, 65, 66

[56] References Cited

U.S. PATENT DOCUMENTS

| | | |
|---|---|---|
| 1,079,766 | 11/1913 | Holm . |
| 2,648,609 | 8/1953 | Wurster . |
| 3,089,824 | 5/1963 | Wurster . |
| 3,117,027 | 1/1964 | Lindlof et al. . |
| 3,161,602 | 12/1964 | Herbig et al. . |
| 3,167,602 | 1/1965 | Bentov et al. . |

(List continued on next page.)

FOREIGN PATENT DOCUMENTS

| | | |
|---|---|---|
| 978264 | 2/1961 | United Kingdom . |
| 1073718 | 6/1965 | United Kingdom . |
| 1135581 | 3/1966 | United Kingdom . |

OTHER PUBLICATIONS

Article entitled: "Encapsulation Utilizing Meltable Dispersion and Cooling Process" in *Microcapsule Processing,* Kondo and Van Valkerberg, Marcel Dekker, New York 1979.

Ajay K. Garg and Lutgard C. DeJonghe, "Microencapsulation of silicon nitride particles with yttria and yttria–alumina precursors", pp. 136–142 of J. Mater. Res., vol. 5, #1,1/90.

M.D. Sacks, N. Bozkurt & Gary W. Scheiffele, "Fabrication of Mullite and Mullite–Matrix Composites by Transient Viscous Sintering of Composite Powders", J. Am. Ceram. Soc. 74(10)2428 ('91).

Ching–Li Hu & M. N. Rahaman, "Factors Controlling the Sintering of Ceramic Particulate Composites: II, Coated Inclusion Particles", J. Am. Ceram. Soc., 75(8)2066–70 (1992).

(List continued on next page.)

*Primary Examiner*—Richard D. Lovering
*Attorney, Agent, or Firm*—Peter K. Trzyna

[57] ABSTRACT

A method for controlling chemical distribution of substances in a solid state (and products produced thereby), the method comprising the steps of mixing particles of a first powder and a triggerable granule facilitator to form first microcapsules, the first microcapsules each having a core of one of the particles and a cladding of the facilitator; and triggering the facilitator while dry mixing the microcapsules to form substantially spherical granules of the microcapsules, the granules each having a controlled chemical distribution.

The method also includes the steps of mixing particles of a second powder with the facilitator to form second microcapsules, the second microcapsules each having a core of one of the particles of the second powder and a cladding of the facilitator; and then mixing the first and the second microcapsules prior to said triggering step.

The method further includes the step of the triggering, mixing the first microcapsules and a second triggerable granule facilitator to form a second cladding on the first microcapsules. To any of the foregoing, there can be the further step of pyrolyzing the microcapsules to remove a portion of the facilitator but leave a resulting pyrolysis product, forming a distribution of the pyrolysis product and the particles. Thereafter, if desired, there follows the step of heating the distribution of the pyrolysis product and the particles to induce a solid state reaction between the pyrolysis product and the particles of the first powder.

35 Claims, 12 Drawing Sheets

U.S. PATENT DOCUMENTS

| | | |
|---|---|---|
| 3,247,014 | 4/1966 | Goldberger et al. . |
| 3,253,944 | 5/1966 | Wurster . |
| 3,293,132 | 12/1966 | Stoyle, Jr. et al. . |
| 3,325,425 | 6/1967 | Bray et al. . |
| 3,326,848 | 6/1967 | Clemens et al. . |
| 3,356,569 | 12/1967 | Nicodemus et al. . |
| 3,361,632 | 1/1968 | Ross et al. . |
| 3,389,000 | 6/1968 | Fujita et al. . |
| 3,401,123 | 9/1968 | Brynko et al. ............... 427/213.31 X |
| 3,419,379 | 12/1968 | Goodale et al. . |
| 3,436,243 | 4/1969 | Kruger . |
| 3,447,950 | 6/1969 | Evans et al. . |
| 3,488,204 | 1/1970 | Jordan et al. ............... 427/213.31 X |
| 3,778,288 | 12/1973 | Ridge et al. ............... 106/502 |
| 3,804,776 | 4/1974 | Yazawa et al. ............... 427/213.3 |
| 4,116,711 | 9/1978 | Avera ............... 106/415 |
| 4,129,638 | 12/1978 | Ritze ............... 264/117 |
| 4,173,492 | 11/1979 | Pollard ............... 264/4.4 X |
| 4,175,976 | 11/1979 | Avera ............... 106/162 |
| 4,230,501 | 10/1980 | Howard et al. ............... 106/502 |
| 4,285,994 | 8/1981 | Pearce et al. ............... 427/222 |
| 4,310,483 | 1/1982 | Dorfel et al. ............... 264/117 |
| 4,339,278 | 7/1982 | Stoffelsma ............... 106/505 |
| 4,404,152 | 9/1983 | Pollock ............... 264/113 X |
| 4,484,952 | 11/1984 | Bes et al. ............... 106/504 |
| 4,495,128 | 1/1985 | Stoffelsma ............... 264/211 |
| 4,551,496 | 11/1985 | Renlund et al. ............... 524/322 |
| 4,871,498 | 10/1989 | Nakamura et al. ............... 264/115 |
| 4,877,562 | 10/1989 | Wilson et al. ............... 264/22 |
| 4,877,840 | 10/1989 | Chu ............... 525/240 |
| 4,915,987 | 4/1990 | Nara et al. ............... 427/190 X |
| 4,999,387 | 3/1991 | Rothon et al. ............... 523/205 |
| 5,009,809 | 4/1991 | Kosin et al. ............... 252/350 |
| 5,019,302 | 5/1991 | Sparks et al. ............... 264/8 |
| 5,028,486 | 7/1991 | Dunski ............... 428/402 |
| 5,037,476 | 8/1991 | Degani et al. ............... 106/437 |
| 5,100,592 | 3/1992 | Sparks et al. ............... 264/7 |
| 5,123,961 | 6/1992 | Yamamoto ............... 106/31 R |
| 5,147,587 | 9/1992 | Marcus et al. ............... 264/113 X |
| 5,175,056 | 12/1992 | Walther et al. ............... 428/403 |
| 5,176,751 | 1/1993 | Findley ............... 106/502 |
| 5,248,550 | 9/1993 | Turpin et al. ............... 427/222 X |

OTHER PUBLICATIONS

Introduction to the Principles of Ceramic Processing, James S. Reed, A Wiley–Interscience Publication, 1988 by John Wiley & Sons, Inc., pp. 284–293.

Colloid and Surface Engineering, Applications in the Process Industries, edited by R.A. William, Butterworth–Heinman, 1992, pp. 56, 89–92 & 102–106.

Barnes, H.A., "Shear–Thickening (Dilatancy) in Suspensions of Nonaggregating Solid Particles Dispersed in Newtonian Liquids," Journal of Rheology, 33[2], 329–366 (1989).

Quemada, D., Rheology of Concentrated Disperse System III. General Feature of the Proposed Non–Newtonian model. Comparison with Experimental Data, Rheol. Acta. 17 [6], 643–663 (1978).

Concise Encyclopedia of Advanced Ceramic Materials, Editor R J Brook, Copyright 1991 Pergamon Press plc, p. 300.

Dictionary of Ceramic Science and Engineering, Loran S. O'Bannon, Copyright 1984 Plenum Press, New York, p. 560.

Hackh's Chemical Dictionary, completely revised and edited by Julius Grant, M. Sc., Ph.D., F.R.I.C., Third Edition, p. 232. (1944).

Fig. 4

Multicored microcapsule, ceramic, C1, coated by metalorganic, M1, as in state 3 of 2 component microencapsulation process Ceramic particles, C2, coated by metalorganic, M2, as in intermediate state 2 of 2 component microencapsulation process

State 1) Mixture of preprocessed multicored microcapsules and precoated particles

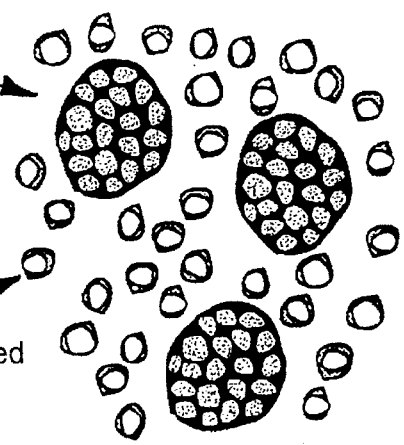

Process step 1)
Mixing with external heater where T (softening) of M2 < (softening) of M1.

State 2) Multicored microcapsules with ordered interfacial mixing.

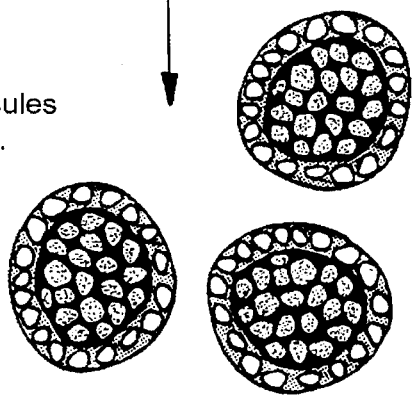

A) 0% magnesium stearate
B) 25 mol% substitution of magnesium stearate
C) 50 mol% substitution of magnesium stearate Microencapsulation sequence using mechanofusion -- 1

PbO + Mg(C₁₇H₃₅COO)₂ powder mixture:

- 1000 rpm, 5 min.;
- external heater off;
- $T_{max, internal} = 22°C$.

———
200μm bar

Microencapsulation
sequence using
mechanofusion – 2

PbO + Mg($C_{17}H_{35}COO$)$_2$
powder mixture:

- 1800 rpm, 20 min.;
- external heater on;
- $T_{external}$ ~ 100°C;
- $T_{max, internal}$ = 108 C.

200μm bar

Granular morphology
of microcapsules

3 PbO + $Nb_2O_5$ +
0.5 $MgCO_3$ +
0.5 $Mg(C_{17}H_{35}COO)_2$
powder mixture.

200μm bar

MULTICOMPONENT POWDER MIXING PROCESS AND COMPOSITIONS PRODUCED THEREBY

BACKGROUND OF THE INVENTION

A. Technical Field of the Invention

This invention comprises a method for mixing multicomponent solids to produce a structured-type of mixing and a controlled level of subdivision. It is a hierarchical mixing process, which can be used to form microcapsules for distributing components which can be useful for high temperature chemistry where enhanced mass transport and controlled sequence of reactions increase solid-state reactivity. The method can also be used to agglomerate the microcapsules into granules.

B. Background of the Invention

1. Introduction

The structure of a mixture of particles can be characterized into two broad classes. These are namely random and nonrandom structures.

Random mixtures are those in which the distribution of components in the composition of nearest neighbor particles relative to a central coordinated particle can be predicted by random population statistics. That is, based upon many samplings of a large population, this type of mixture displays a variance that can be reliably predicted by statistics.

A nonrandom mixture is one whose variance cannot be predicted in this fashion. Thus, at some scale, a poorly blended mixture is a nonrandom mixture. Another example is a perfectly structured mixture where components are arranged in uniform arrays.

There are a number of criteria that can be used to distinguish the differences between these classes of mixtures, including scale of segregation, ordering of component interfaces and packing density of components. First, scale of segregation can be used. Scale of segregation is determined by the number and size of particles of one composition separating two particles of another composition. Scale of segregation increases as the number of components increases but decreases as the particle size decreases. In a conventionally processed random mixture, the segregation scale usually corresponds to tens of particle diameters or greater. For a poorly mixed system, the scale can be many order of magnitudes greater. For the structured mixture, however, the segregation scale is perhaps only a few particle diameters. Although such a scale of mixing is difficult if not impossible to achieve, this type of structure can be approached.

When examining mixtures, at least two levels of hierarchy or levels of organization in the mixture are important, the hierarchy at the particle scale and the hierarchy at the granule scale (see definition of granule below). As to the former, if the mixture of particles is random, there is no ordered hierarchy. But if particles of one composition were to have a coating of another composition and the coated particles are not arranged into any particular array or pattern, then ordered mixing occurs on a single level of mixing hierarchy, that being the particle level. But if, instead, these coated particles are organized into spherical granules, then there are two levels of mixing hierarchy.

With these distinctions in mind, one can understand the numerous methods for making multicomponent mixtures that existed prior to the present invention, the compositions produced thereby. These mixing methods are capable of combining organic, organometallic, metal organic, and ceramic components and developing mixing scales that vary from molecular dimensions to that of many orders of magnitude greater.

For example, chemical synthesis methods provide a means for preparing compounds that have a segregation scale on the order of molecular dimensions. Specific techniques such as sol-gel and coprecipitation also offer this advantage, although the viability of these techniques depends on the constraints imposed by specific chemical system at issue. These methods are often difficult to engineer, and typically, there is a high cost for precursors required to prepare these intimate mixtures.

Dry mixing methods have usually been thought to represent the opposite end of the segregation scale spectrum. These methods, typically conducted with mixers such as pan mixers, v-blenders, and dry ball mills, rely on the force of gravity for homogenization. In part because this force competes with adhesional van der Waals forces, it has generally been thought that these methods cannot be effectively used for particle sizes less than about 44 µm, which results in a relatively large scale of component segregations in the bulk mixture. Accordingly, these methods have been associated with very high segregation scales.

Conventional wet mixing methods, such as high shear intensive mixing (for pastes), wet ball mixing (for slurries) and blunging (for more dilute suspensions) all are more capable of achieving segregation scales that are smaller compared to scales of segregation achieved by dry mixing. Wet mixing can achieve better random mixtures because adhesional forces of particle agglomerates can be reduced if not overcome by suspension of particles in a liquid solvent. However, these methods are prone to other problems. As these are multi-step processes (e.g., dispersion/mixing/separation/dewatering), they are heavily dependent on optimizing colloid and rheological properties to minimize segregation and avoid chemical interactions that may alter the chemical identity of one of the components.

Constraints associated with wet mixing include the necessary selection of a solvent that will wet the surfaces of powder being dispersed without dissolving the powder. Also, solvent removal must be evaluated in order to reduce segregation of particles due to uneven settling, which is a consequence of differences in particle size and density.

A nonconventional wet mixing process is mutual flocculation, where colloidal forces are controlled as a means to yield structured mixing. However, lengthy development times are usually needed to optimize the suspension formulation. In addition, mutual flocculation (also known as selective flocculation) at best can provide ordered mixing on only one level of mixing hierarchy. Further, the organization of structures produced by this method degrades rapidly as the number of components exceeds two.

2. Microencapsulation

Microencapsulation is another nonconventional mixing process in which a particle is encased by a coating, and therefore this type of mixture is nonrandom. Microencapsulation has been used for many commercial applications such as in pharmaceuticals, cosmetics, agricultural products, and photoduplication toners. Advantages of this process include relatively short process development times ability to form a number of different microcapsule morphologies with a range of core sizes.

In addition, the porosity of the encapsulating layer can be modified to tailor dissolution properties of the core for the purpose of time-controlled release of specific compounds or to ensure passivation of toxic substances.

Wet, vapor, and dry methods are available for the synthesis of microencapsulated powders. Wet methods include precipitation coatings, made by processes in which core particles are dispersed in a solution and precipitation of an encapsulant is induced to form the surface of the core. Unfortunately, the throughput of such processes has been low, leading to poor process economy in most applications. Emulsions have also been used to encapsulate liquids, for example, by polymerizing a monomer species to stabilize an emulsified droplet. As far as is presently known, this process has not been used to prepare encapsulated solids.

Spray drying has been used to prepare encapsulated solids by taking core particles suspended in a solution, forming an aerosol of the suspension, and evaporating the solution in a heated chamber to form a coating from the solution on the core particles. Spray drying is an empirically optimized process, energy intensive, and can only be effective when conducted (for larger particles) on a large scale. Common to all processes above, wet microencapsulation methods all suffer from the complexities introduced by the need for controlled suspension stability and rheological properties. Suspension stability and rheology are properties whose control can vary considerably from chemical system to chemical system.

Vapor phase methods include dispersal of particles in a vapor stream containing the microencapsulant. Dispersal of the core powders can occur, for example, in a fluidized bed, if the core particles are large enough to be fluidized. The microencapsulant is introduced as a vapor phase precursor that can be thermally or chemically decomposed to precipitate a coating as the core particles circulate in the fluidized bed. However, this process seems to be effective only for relatively coarse particles. Alternatively, finer particles can be entrained in a gas stream to avoid some of the problems associated with a fluidized bed. Unfortunately, dilute streams of particles are employed, usually rendering the process uneconomical.

Only one dry microencapsulation method referred to as mechanofusion, is known to have been reported whereby coarse particles (i.e., >30 μm) are mixed with relatively fine particles in a highly compressive shearing force field to form coated particles. In all cases, one component must be significantly softer than the other; and if harder particles are assembled as a coating on a softer core, then there must be a significant size difference between core and coating particles, with the cores being at least ten times the diameter of the coating particles. Further, the method is optimized for spherical core particles; if non-spherical core materials are used that are ductile (e.g., metal powders), then such core particles are made more spherical by the mechanofusion process. Thus, organic core particles are coated by inorganic particles by an impregnation process. Metal core particles can be impregnated by ceramic particles to form a hard, dense outer coating. Alternatively, hard ceramic core particles can be coated by ductile metals or soft organic coatings to produce a controlled mixing hierarchy. However, as far as is presently known, only a single level of mixing hierarchy has been achieved.

3. Granulation

Granulation is a process whereby particles are bound together by either an aggregative or globulation process. Granulation is performed to impart flowability to the powder for facile transport, to minimize dusting by elimination of free fine particles, to impart uniform compaction properties for dry pressing forming methods, and to lead to high permeability powder beds when labile gas circulation is required.

Wet methods are primarily used to granulate powders by using either an aggregative or a globulation process. Pendant capillary forces can be used to aggregate particles using conventional mixing equipment by the gradual addition of liquid to the dry powder. In a similar manner, fluidized beds can be used to granulate via the introduction of liquid into the circulating bed of powder (the liquid can also contain dissolved species to act as a microencapsulant). However, in all of these cases, there is no means for morphology control.

Spherical agglomeration methods offer one of the few methods to achieve spherical granules. In these methods, emulsions are used to form spherical aggregates by isolating particles in an immiscible dispersed liquid phase. Globulation methods, more commonly known as spray drying or sol-gel globulation, also have morphology control limitations where the surface energy minimization of the droplet induces a spherical shape and removal of the liquid from the droplet induces agglomeration of the particles. However, these methods of obtaining dense homogeneous particles are empirical processes that usually require a great deal of trial and error in applying general idea of the process to a specific chemical System. Furthermore, control of the granule size depends on aerosol technology. In general, as the size decreases, the throughput decreases substantially.

Very rarely have dry methods been used for forming granules. A method known as hybridization has been used where fine particles entrained in a gas are impacted with coarse core particles to form a structure where fine particles adhere to the core. The morphology of the granule is dependent on the morphology of core. Viability of this process is also dependent on maintaining a coarse core particle (>30 μm) and a fine coating particle. Like mechanofusion, this process is dependent on combining a soft component with a hard component. Control of the hierarchic structure beyond a single level has not been reported.

Accordingly, prior to the present invention, there remained to be discovered a generalizable, hierarchically controllable mixing process for producing an ordered distribution of substances in the solid state.

4. Thermal Processing

In ceramics powder processing, thermal treatments are necessary for several objectives including the removal of organic processing aids, reaction between multicomponent powders, sintering, and vitrification. Thermal processing may be classified as intermediate (~200°–600° range) or high temperature chemistry (above 600° C.). Pyrolysis reactions involving the removal (i.e., burnout) of organic components typically occur in the intermediate range. Calcination reactions involving the decomposition of metal salts (e.g., conversion of magnesium carbonate to magnesium oxide) most often occur in the intermediate range, but in some cases require higher temperatures. High temperature reaction are most often associated with enhanced mass transport phenomena in the solid state; these include solid state chemical reactions, densification and coarsening.

5. Organic Pyrolysis and Calcination

Organic binders are often used in granulation or forming processes to impart physical cohesiveness between particles. However, these binders must be eliminated in the final product piece. This is accomplished by a controlled pyrolysis of the organics at an intermediate temperature, a process known as "binder burnout."

6. Calcination

Aside from organic binders, calcination of ceramic powder mixtures is another important thermal process utilized at intermediate or high temperatures. Many times, ceramic components are utilized in forms such as carbonates, nitrates, hydroxides and acetates. During heating these salts decompose into oxides. Sometimes these reactions occur at low temperatures and other times they only proceed at high temperatures depending on the processing atmosphere, thermal history and physics and chemistry of the powder. It is well established that for a particular salt, particle size is an important variable since it controls the path and time required for mass transport or heat transfer. Mass transport and/or heat transfer processes rate-limit the decomposition of these salts (as well as the organic phases described above). In general, smaller particle sizes of the salts promote rapid reactions since they decrease the distances over which mass transport must occur.

7. Solid State Reactions

During or after the calcination stage, two classes of high temperature solid state reactions occur that are relevant to the proposed invention. Both classes are fundamentally driven by thermodynamics, resulting in a decrease of surface energy and or chemical energy. In the solid state, rates of reaction are most often limited by mass transport; mass transport is governed by diffusion which increases with increasing reaction temperature. However, there are usually processing constraints on the temperatures that can be used; therefore, other methods for increasing solid state reactivity are desirable.

The first class of solid state phenomena occur When the various phases in the powder mixture are stable. Mass transport will occur in a fashion that will facilitate the loss of surface area and possibly a reduction in porosity. A reduction of both surface area and porosity is referred to as densification, a process typically employed in the processing of metals, polymers (at low temperatures, ~$100°$–$200°$ C.) and ceramics. When only surface area is reduced this is referred to as coarsening, a process of use whenever interparticle bonding is not of interest (e.g., the processing of porous catalyst supports). There has been a great deal of research devoted to sintering high temperature materials such as non-oxide ceramics (e.g., silicon nitride) that are difficult to densify. It has been found that additions of small amounts of additive (i.e., yttria, magnesia, alumina) can aid in densification. There has been recent research on optimizing the distribution of sintering aids by particle coating processes. However, in the prior art, no process has been reported for incorporating sintering aids into triggerable encapsulants and distributing them in a microencapsulated form, as is provided by the present invention.

The second class of phenomena involves chemical reactions between components in the solid state mixture. This occurs when various phases in the powder mixture are thermodynamically unstable as separate species and react with one another. Like calcination, the process is rate limited by mass transport process (less likely to limited by heat transfer). Usually the rate determining mass transport process is diffusion. In all cases, the finer the level of subdivision (particle size) and homogeneity of the mixture, the more rapid are the high temperature solid state reaction kinetics. This is because both homogeneity and particle size both serve to decrease the distance over which species must diffuse in order to initiate and continue the thermodynamically driven solid state reaction. In addition, another factor promoting the reaction kinetics is the packing density of the powder mixture.

Densely packed multicomponent powder mixtures will react more rapidly than loosely packed mixtures since increasing density is a means for decreasing the distance required to transport reactant species. For this reason, multicomponent mixtures are sometimes pelletized prior to solid state reaction. However, after solid state reaction, an aggregated structure results and must be comminuted prior to any subsequent processing can commence. For many conventional mixtures, mixing homogeneity is insufficient thus requiring additional iterative pelletization, solid state reaction and comminution steps.

8. Chemical Reaction Intermediates

In many cases, the formation of metastable intermediate phases are a problem in the synthesis of multicomponent phases. In ceramics, the formation and decomposition of these phase intermediates can rate limit the formation of the desired phase instead of the characteristics of the mixture. For instance, in the synthesis of $Ba_4Y_2O_7$, $Ba_2Y_2O_5$ forms prior to the appearance of $Ba_4Y_2O_7$. In other cases, intermediates form that do not necessarily have to appear prior to the formation of the desired multicomponent phase. For instance, in the synthesis of $Pb(Mg_{1/3}Nb_{2/3})$, highly undesirable impurity phases with other stoichiometries can also form and can be difficult or impossible to eliminate. In this case, prereaction processes are employed to preclude formation of impurity phases. For instance, in the synthesis of $Pb(Mg_{1/3}Nb_{2/3})O_3$, in order to avoid impurity lead niobate phases, magnesium and niobium oxide phases are reacted to form the magnocolombite phase before it is mixed with lead oxide. However, the introduction of prereaction steps serves to introduce many additional processing steps since two solid state reaction processes are being merged together.

OBJECTS OF THE INVENTION

An object of the present invention is to provide a hierarchical mixing process for producing an ordered distribution of substances in a solid state.

A further object of the present invention is to provide by this process an ordering of chemical interfaces for solid-state reactions between specific components of the mixture.

Another object of the present invention is to provide a mixing process to improve over the aforementioned limitations of the prior art.

Another object of the present invention is to provide a mixing process to provide means for achieving higher levels of mixing hierarchy and variations in those levels, than by previous processes.

Yet another object of the present invention to provide a mixing process which enhances powder handling and forming processes.

Still another object of the present invention is to provide a process useful for coating hazardous core materials with a non-hazardous material, for purposes of environmental health and safety.

Other objects of the present invention will become apparent from the following summary of the invention, drawings, and detailed description of the invention and a preferred embodiment of the invention.

SUMMARY OF THE INVENTION

These and other objects are addressed by a method for forming a controlled distribution of substances in a solid state, the method including the steps of mixing particles of a powder and a second substance (which can have a reactive component) to form microcapsules, the microcapsules each having a core of one of the particles and a cladding of the second substance, and then inducing a solid state reaction between the particle core and the reactive component. This method can use a triggerable granule facilitator as the second substance; and the method can also include the step of triggering the facilitator while dry mixing the microcapsules to form substantially spherical granules of the microcapsules, known as "multicore microcapsules." At this second level of variation, a solid state reaction is not required to perform the method of the invention, but optionally, a solid state reaction involving components of the multicore microcapsule can be induced.

The microencapsulation process of the present invention, therefore, includes a series of steps which occur in a processing sequence modifiable in a structured manner to create highly ordered compositions of at least two components. Versions of the basic idea of the process span from its most basic form of coating a particle by any method (but from the standpoint of solid state reactions, it is preferable to use the coating to distribute constituents for a solid state reaction—for example, coating a metalorganic on ceramic particles to distribute the metal such that after pyrolyzing the coated particles, there is an enhanced solid state reactivity) to forming complex, ordered multilayered and multicored microcapsule structures for a broad range of purposes.

The powders used as core particles may be ceramic, metal, organic, or polymeric materials. Also, the core particles may be of any morphology (i.e., regular or irregular in shape), with a fine particle size relative to other dry mixing techniques (e.g., particle size finer than 325 mesh). The triggerable granule facilitator can also be added in the form of a finely divided powder (e.g., finer than 325 mesh).

The triggerable granule facilitator can be characterized by its properties as a dry lubricant which can undergo mechanical deformation (i.e., the facilitator is softer than the core particles); and which undergoes a glass transition or softening point preferably at a temperature at least several degrees below its melting temperature. The facilitator should be spreadable over the particle surfaces by mechanical shear and compressive stresses. At lower temperatures (i.e., the starting temperature of the mixer, e.g., room temperature) the encapsulation process is aided by the lubricating property of the facilitator. But by increasing the mixing temperature to the softening point of the facilitator, at which point the facilitator is transformed into a cohesive binder, the facilitator causes the encapsulated core particles to agglomerate together into densely packed spherical-shaped granules.

The triggerable granule facilitator may be chosen simply for its utility as a lubricant/encapsulant/binder, or as previously indicated, it may include active chemical components for use in subsequent processing steps (e.g., metal cations for use in a ceramic/metal solid state reaction). For example, excellent results have been obtained using stearate soaps of various metals (e.g., Mg, Ca, Ba, Zn, Pb, Sr, Li) the "second substance," preferably as a heat-triggerable granule facilitators.

In contrast to the random mixing processes of the prior art discussed above, in which the length scale for obtaining a homogeneous compositional sampling is approximately 20 times the mean particle diameter, for a particle core having a cladding of a second composition, the scale of segregation is the particle radius. Therefore, by virtue of the present invention, a 40-fold reduction in segregation scale between components is achieved. For diffusion-limited solid state reactions, reaction rate is proportional to the inverse of the segregation scale squared, such that by the virtue of the present invention, the net rate of reaction in the case of particle coating is approximately three orders of magnitude higher than that for a comparable random mixture.

In contrast to the chemical synthesis methods of the prior art, the present invention is more versatile with respect to compositional specifications and does not require the often complex chemistry of forming uniform co-precipitations of substances that one desires to have a mixture of.

BRIEF DESCRIPTION OF THE DRAWINGS

FIG. 4 is an invention schematic which diagrams a four-component ordered mixing microencapsulation process.

DETAILED DESCRIPTION OF THE INVENTION AND A PREFERRED EMBODIMENT THEREOF

A. General Case

1. Process Steps

The invention provides a system for forming multicore microcapsules to produce a number of differently ordered structures. FIGS. 1 through 4 are illustrations of several of the ordered structure types that can be achieved by virtue of the present invention. In the cases illustrated in the FIGS., the triggerable granule facilitator is a metalorganic soap; however, the choices of facilitators are by no means limited to such metalorganics.

Figure 1:
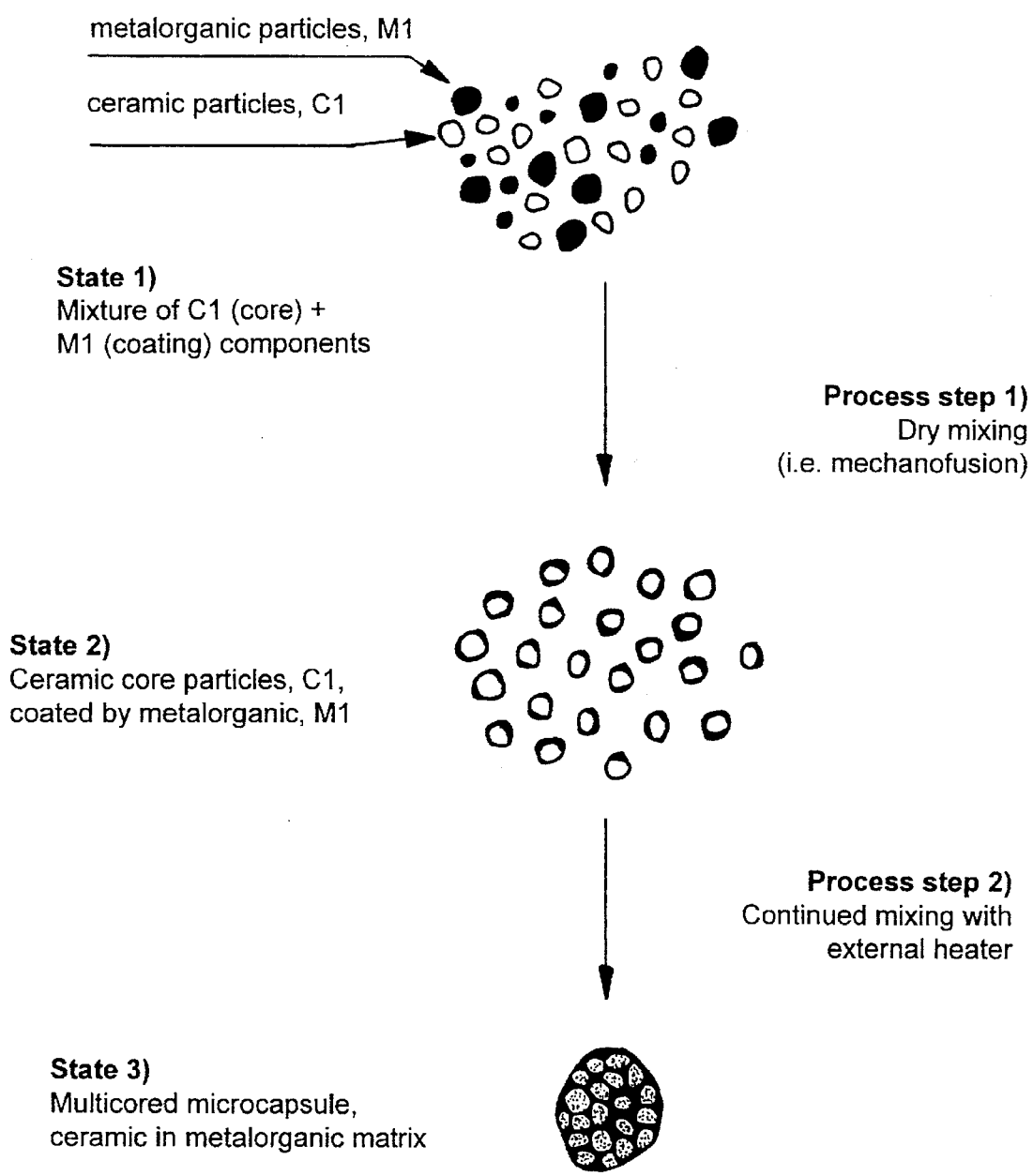
FIG. 1 is an invention schematic which diagrams a two-component microencapsulation process according to the present invention.

In the simplest granulation case, core particles of a single composition are encapsulated by a substance, preferably a triggerable granule facilitator, then the facilitator is triggered to form multicore microcapsules, as shown in FIG. 1. The Invention Schematic: 2 Component Microencapsulation process of FIG. 1, shows as an example metalorganic particles M1 mixed with ceramic particles C1 in the initial or "State 1)". Process step 1) includes mixing—preferably, but not necessarily dry mixing, for example, by the mechanofusion apparatus. State 2) shows ceramic core particles C1 coated by metalorganic M1. If the process is pursued (e.g., no solid state reaction is induced), then Process step 2) shows continued mixing while triggering the coating to form granules, here by means of a heat-induced triggering. This results in state 3), in which a granule, also referenced herein as a "multicored microcapsule," is produced.

Figure 2:
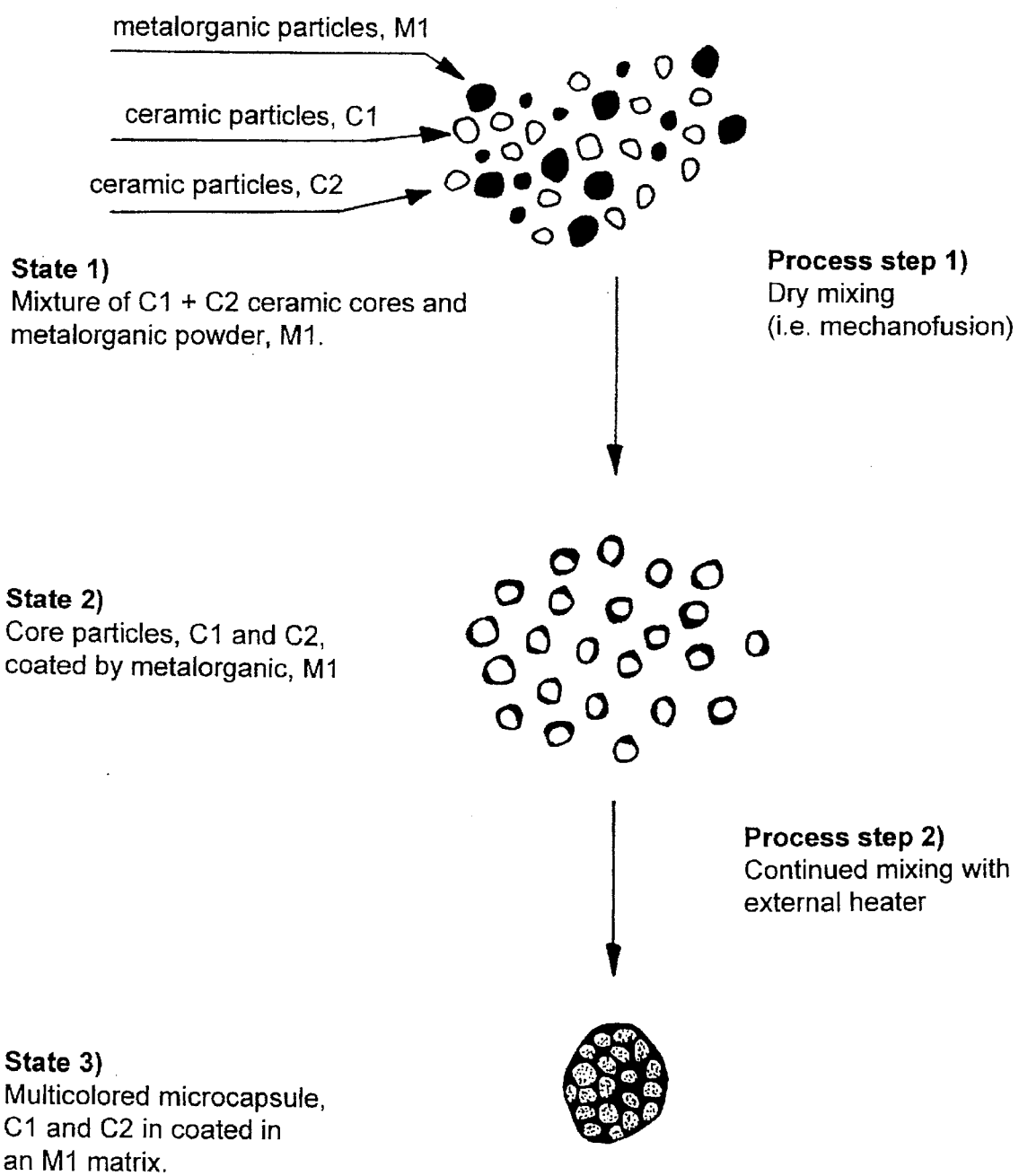
FIG. 2 is an invention schematic which diagrams a three-component microencapsulation process.
Figure 3:
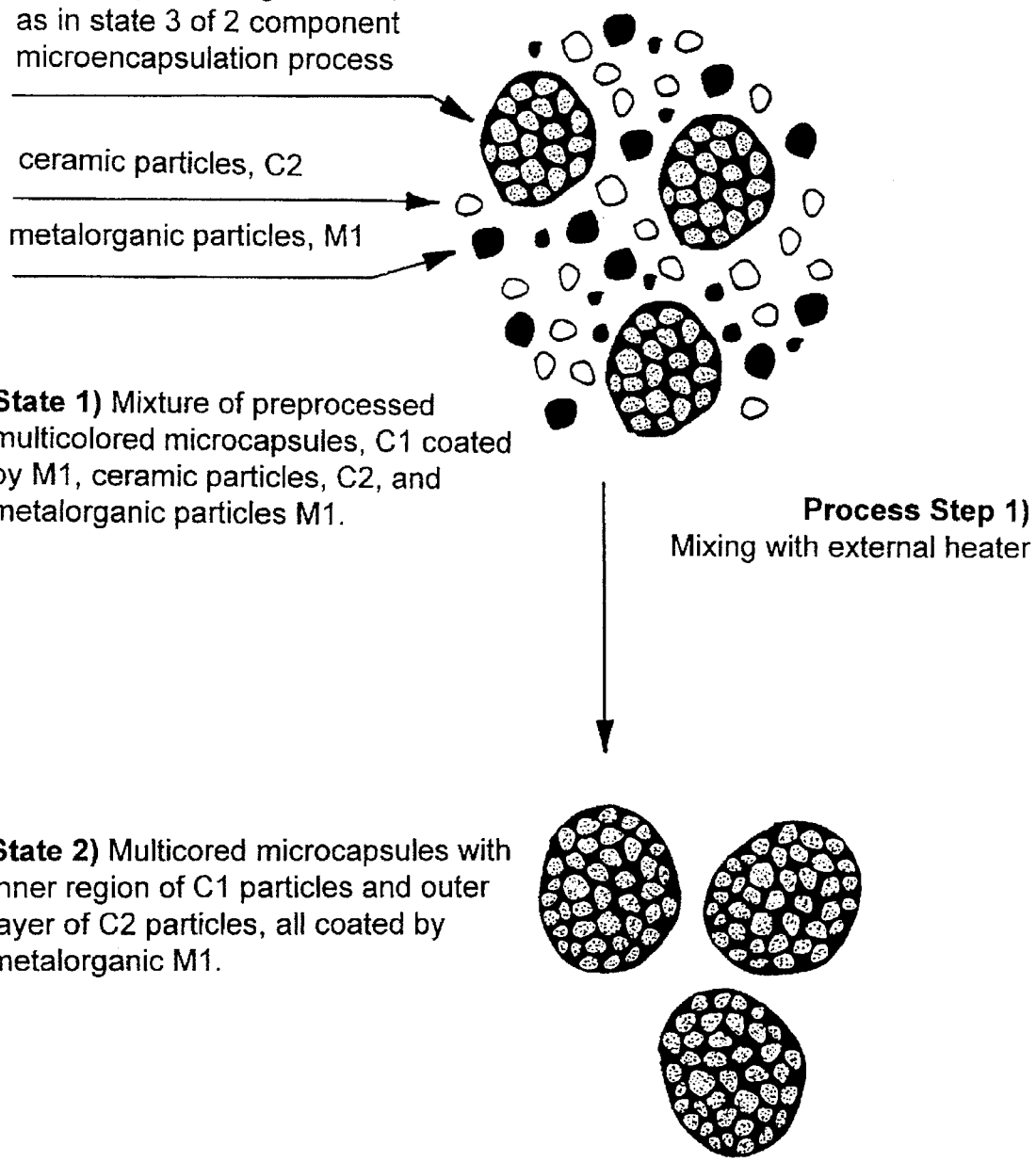
FIG. 3 is an invention schematic which diagrams an alternative three-component microencapsulation process.

If core particles of more than one composition (or size) are used instead, then the result is a multicore microcapsule in which the various core particles are randomly arranged, as is illustrated in Invention Schematic: 3 Component Microencapsulation Process FIG. 2. FIG. 2 shows as the initial State 1) an example of three components in a mixture: the same metalorganic particles M1 and ceramic particles C1 as above, but also ceramic particles C2, having a chemical composition that is different from either M1 or C1. The same Process step 1) as set out above is performed, but in this case, the result in State 2 is that both ceramic particles C1 and ceramic particles C2 have been respectively coated by metalorganic M1. If it is desired to have a coating be more than just a means for distributing an active species for a solid state reaction, the coating can be a triggerable granule facilitator, triggered in Process step 2. The result is shown in state 3) as a multicored microcapsule in which ceramic particles C1 and C2 are coated in an M1 matrix.

Still another version in this hierarchically controllable process is shown in Invention Schematic: Alternative 3 Component Microencapsulation Process of FIG. 3. This two-step mixing process can build on the processes discussed with respect to FIGS. 1 or 2, here shown as building on the process of FIG. 1. To the multicored microcapsules of ceramic C1 coated by metalorganic M1 as in state 3) of the 2 component microencapsulation process, there is added ceramic particles C2 and metalorganic particles M1. (Of course, the particles C2 could have a coating of the metalorganic M1 applied in a separate step, and the coated C2 particles thereafter added to the multicore microcapsules.) In any case, once the C2 particles are coated, the facilitator can be triggered in Process Step 2) of FIG. 3. The result in State 2) is multicored microcapsule with granular core of C1 particles and a granular cladding of C2 particles, all coated by metalorganic M1.

Still another granule structure according to the present invention can be assembled with a granular core/granular cladding, as is illustrated in FIG. 4: Invention Schematic: 4 Component Mixing Microencapsulation Process. In these cases, pre-granulated material (produced, for example, by the process steps illustrated in the previous FIGS.) is introduced to secondary core particles encapsulated by a secondary facilitator M2, as in State 1). The secondary facilitator M2 is then triggered in Process Step 1) of FIG. 4, preferably without retriggering the facilitator M1. This can be accomplished for example, by heating the mixture to a point sufficient to trigger M2 but not M1. The result shown in State 2) is a granular cladding of the secondary particles C2 in metalorganic M2, formed around the pre-granulated material of C1 and C2.

The random arrangement of core particles, each encapsulated by a different facilitator, may be accomplished by cladding each type of core separately, then mixing them together and triggering the facilitator(s) to form granules. Alternatively, or in addition to any of the foregoing, prior to the triggering step(s) in the processes, the initial particles can have a prior coating, or the microcapsules of C1 (and/or C2) can be mixed with a second triggerable granule facilitator, to form a second cladding on the first microcapsules.

In any of the foregoing versions of the hierarchical process of the present invention, the chemistry of the triggerable granule facilitator (i.e., encapsulant) may be chosen such that a subsequent pyrolysis of the multicore microcapsules can either eliminate all or a portion of the encapsulant (i.e., coating) phase. In the case of the pyrolysis process resulting in the complete removal of the encapsulant, the utility of the product may be based on the structural ordering of components on the granule scale. Alternatively, in the case of the pyrolysis step removing only a portion of the encapsulant but leaving a resulting pyrolysis product, an ordered distribution of the pyrolysis product and the core particles results. Further, these two variations of pyrolysis results can be combined in a single type of granular structure. For instance, a granule consisting of compositionally discrete facilitators within the granular core and the granular cladding, as shown in FIG. 4, could be pyrolyzed to leave a pyrolysis product in the granular core but not in the granular cladding.

Thereafter, if desired, the process can include heating the distribution of the pyrolysis product and the particles to induce a solid state reaction between the pyrolysis product and the particles. Alternatively, a composite product containing the discrete phases of the pyrolysis product and core particles can be formed.

As can be seen without belaboring the point ad nauseam, by coating particles and by forming granules, each being layerable, there is a generalizable system for hierarchically controlling mixing of substances in a solid state, preferably for ordering chemical interfaces for solid-state reactions.

2. Compositional Examples

The structural ordering of components on the granule scale can be controlled by adding steps to the processing sequence. In a single mixing, two or more core components made of a ceramic (e.g., lead oxide, niobium pentoxide and magnesium carbonate) are mixed with a facilitator (e.g., stearate soap), encapsulated and granulated to form a random mixture of cores in a stearate matrix, as discussed in greater detail with respect to FIG. 2. Alternatively, the double mixing process of FIG. 3, a first component C1 is (e.g., lead oxide core particles) first coated with M1 (e.g., magnesium stearate) and triggered to form granules; the second and/or third component C2 (e.g., niobium pentoxide and/or magnesium carbonate) and additional magnesium stearate) is added and the coating is re-triggered to form a granular cladding of the second and/or third layers around the granular core.

The type of granule-scale ordering using different facilitators in multiple-mixings, as shown in FIG. 4, can produce other compositional structures. For example, a two-component granule having a core (e.g., lead oxide) encapsulated by a cladding (e.g., magnesium stearate) could be used as a granular core, followed by a granular cladding of another component (e.g., niobium pentoxide) encapsulated in by a second facilitator (e.g., zinc stearate). In this version of the process of the present invention, the granulation temperature (i.e., softening point) of the first facilitator (e.g., magnesium stearate) is greater than that of the second facilitator (e.g., zinc stearate); thus a granular cladding of the second component and the second facilitator can be applied by adding enough heat to trigger the second facilitator (e.g., zinc stearate) but not so much heat as to reach a temperature sufficient to disassemble the granular core by melting or sufficiently softening the first facilitator.

3. Process Equipment

Figure 5:
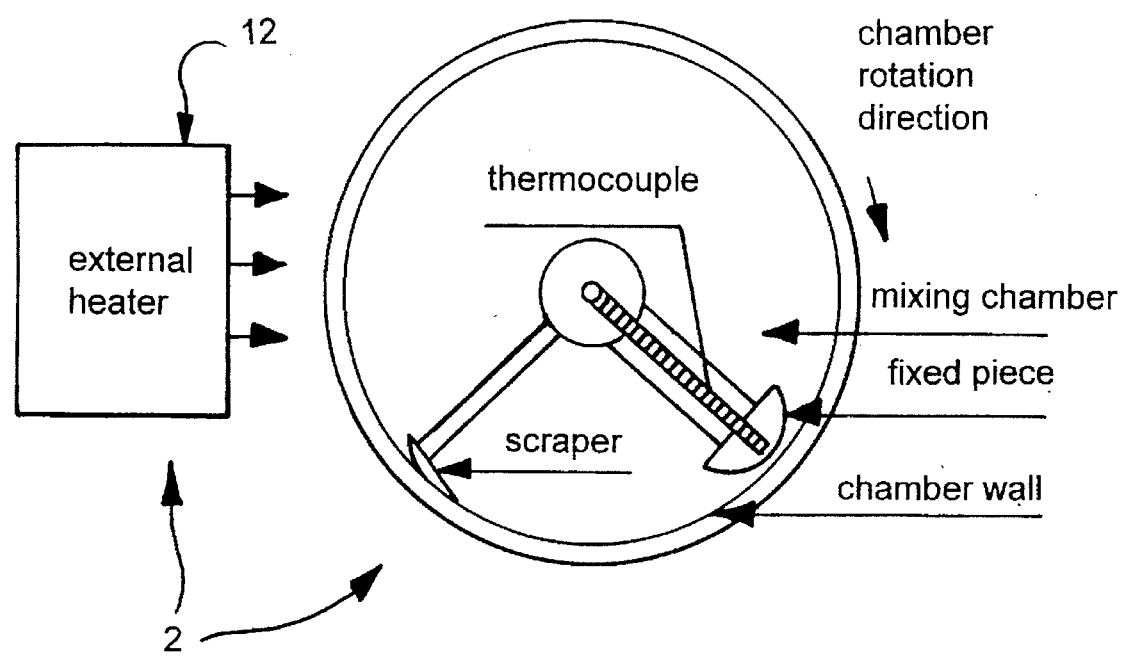
FIG. 5 is a schematic illustration of a mechanofusion (AM-15F) device, which can be used in the process of the present invention.

In an embodiment of the invention preferred for producing more complex levels of mixing, particles and the triggerable granule facilitator are mixed together and loaded into a high shear mixing device, as illustrated in FIG. 5.

More particularly, the process of the present invention can be performed with, but is not limited to, such commercially available mixing equipment as the mechanofusion AM-15 apparatus, available from Micron Powder Systems, Summit, N.J. For such mixing equipment, the important requirements are that it be capable of generating high interparticle shear and/or compressive forces and that its operating temperature be an externally controllable process parameter.

As illustrated in FIG. 5, mechanofusion device 2 has a chamber wall 4 that rotates in a chamber rotation direction. Within the chamber wall 4, there is a mixing chamber area 6 for containing the components to be mixed. Scraper 8 and fixed piece 10 stand firm against the components as they are mixed and exert shear and compressive forces on the components. Heat produced by heater 12 is controllably directed at the chamber wall 4 to heat the substances within the mixing chamber area 6. The amount of the heat is monitored by thermocouple 14 in the fixed piece 10.

In a preferred embodiment of the present invention, the particles are ceramic and the triggerable granule facilitators are metalorganic coating materials (e.g., Mg, Zn, Ca, Sr and Ba stearates, Witco Corp, New York, N.Y.). However, the method also is believed to be workable with other materials and equipment. But for this embodiment, important characteristics of the triggerable granule former (metalorganic soap) are its physical form as a powdered solid and its softening point (i.e., glass transition point) so to be a heat-triggerable granule facilitator within the temperature range of the mixer. For solid state reactivity, the soap should also be selected for its functionality as a reactive chemical constituent to provide a desired cation to the multicomponent mixture.

The combined powders are first premixed, for example, at approximately 350 revolutions per minute (rpm) for approximately 5 minutes. During this initial pre-mixing step, some preliminary surface coating of the core particles by the facilitator is achieved. (See FIG. 7.)

Second, the speed of the mixing chamber # is then increased to about 1000 rpm and an external hot air heater can be applied. During this period of higher speed mixing, the particles become well coated by the facilitator. (See FIG. 8.)

Third, the heater 12 is used to increase the mixing temperature to the point at which the facilitator begins to soften, to trigger granulation of the coated particles. For the stearate soaps that have been evaluated as triggerable granule facilitators, the temperature of granulation has been found empirically to be approximately 40° C. below the melting point of the stearate soaps. For the specific examples of stearate soaps discussed in this section of the embodiment, melting temperatures ranged from 110° to 160° C. The onset of granulation is typically marked by the audible vibration of the mixer and an abrupt increase in mixing temperature, corresponding to the increased frictional drag caused by the formation of coarser microcapsules. At this point, the mixing speed is reduced to a slightly lower speed (e.g., 800 rpm) until the temperature stabilizes, and mixing is continued for approximately 5 minutes, whereupon the material is removed from the mixer. (See FIG. 9.)

B. Highly Detailed Specific Example Involving Lead Magnesium Niobate

Lead magnesium niobate, $Pb(Mg_{1/3}Nb_{2/3})O_3$ (PMN), was chosen as the target material to teach the invention because PMN is difficult to prepare as pure perovskite phase by using conventional mixed-oxide processing; previous work has shown that high perovskite yields can be obtained only by prereaction and multiple calcination steps. On the other hand, the sol-gel method has been used to produce phase-pure perovskite with a single-step calcination at relatively low temperatures. The high phase purity resulting from the sol-gel approach is largely a consequence of small segregation scale. Thus for PMN, perovskite yield can be used as an indicator of segregation scale.

Although the highly detailed application of the process to a specific system investigated was lead magnesium niobate (PMN), it should be plainly recognized that this process is applicable to a wide range of other compositions.

1. Experimental Design

More particularly, the effects of batch composition and mixing method on the physical structure of unfired powder mixtures and reactivity during subsequent calcination are discussed herein to illustrate the process and its effectiveness. Batch composition was varied by molar substitutions of magnesium stearate for magnesium carbonate; substitution of magnesium stearate and mixing methods used for each batch are shown in Tables 1.

TABLE 1A

| Batch Compositions and Resultant Perovskite Yields |||
|---|---|---|
| Mol % subst Mg stearate for $MgCO_3$ | Batch vol % Mg stearate (unfired) | Batch wt % loss on ignition |
| 0 | 0.0 | 4.3 |
| 10 | 25.4 | 7.4 |
| 25 | 46.6 | 12.2 |
| 50 | 64.6 | 20.0 |
| 75 | 74.1 | 27.8 |
| 100 | 80.0 | 35.6 |

Table 1B

| Batch Compositions and Resultant Perovskite Yields Perovskite yield (vol %)* 800° C., 3 h ||||
|---|---|---|---|
| BM | MF1 | MF2 | BM-MF1 |
| 66.0 (3.5) | 70.3 (4.5) | | |
| | 87.2 (1.5) | | |
| 66.3 (2.3) | 85.8 (4.0) | | 87.3 (1.9) |
| 71.9 (3.3) | 88.3 (1.2) | 89.0 (1.9) | |
| 83.3 (3.8) | | | |
| 86.5 (3.0) | 87.5 (2.3) | 86.4 (2.4) | |

*Range of error based on standard deviations of XRD peak fitting given in parentheses.
BM = ball milling; MF1 = one-step mechanofusion; MF2 = two-step mechanofusion; and BM-MF1 = one step mechanofusion, premixed by ball milling.

TABLE 1C

Batch Compositions and Resultant Perovskite Yields
Perovskite yield (vol %)*
900° C., 3 h

| BM | MF1 | MF2 | BM-MF1 |
|---|---|---|---|
| 78.6 (3.2) | 68.9 (3.0) | | |
| | 89.5 (1.2) | | |
| 80.0 (1.8) | 86.5 (2.1) | | 90.0 (1.8) |
| 81.8 (3.0) | 91.0 (3.0) | 96.9 (1.6) | |
| 88.5 (1.9) | | | |
| 95.3 (2.9) | 96.8 (1.5) | 98.1 (1.9) | |

*Range of error based on standard deviations of XRD peak fitting given in parentheses.
BM = ball milling; MF1 = one-step mechanofusion; MF2 = two-step mechanofusion; and BM-MF1 = one step mechanofusion, premixed by ball milling.

All batches were prepared according to the stoichiometry for perovskite PMN, $Pb(Mg_{1/3}Nb_{2/3})O_3$. Raw materials used were: lead oxide (PbO, Fisher Scientific, Fairlawn, N.J.), niobium pentoxide ($Nb_2O_5$, Alfa Products, Johnson Matthey, Danvers, Mass.), magnesium carbonate ($MgCO_3$, Fisher Scientific, Fairlawn, N.J.) and magnesium stearate ($Mg(C_{17}H_{35}COO)_2$, Witco Corp., New York, N.Y.). The mean volume particle sizes and standard deviations (given in parentheses) were: lead oxide=5.6 (3.0) microns, niobium pentoxide=2.8 (1.5) microns, magnesium carbonate=14.6 (7.7) microns and magnesium stearate=13.9 (10.2) microns. The lead oxide was primarily massicot phase, JCPDS card 38-1477, with some minor amount of litharge, JCPDS card 5-561; the niobium pentoxide was predominantly the low temperature orthorhombic phase, JCPDS card 27-1003, with a minor amount of a higher temperature monoclinic phase, JCPDS card 27-1311.

Several mixing sequences were employed to demonstrate the invention. A one-step method involved the combination of all components in a single mixing operation. A two-step method also was used in which the full batch amount of lead oxide was first mechanofused with part of the magnesium stearate, forming core granules; then the balance of materials (niobium pentoxide, the remaining magnesium stearate, and magnesium carbonate) was added and the batch was mechanofused again. Another sequence was used to illustrate the effects of premixing before one-step mechanofusion to inhibit preferential losses of one component relative to another.

Premixed powders were prepared by ball milling in ethanol, and the resulting product was then dried and broken into a fine powder before mechanofusion. Other batches were mixed only by ball milling in ethanol to establish a baseline for comparison with conventional processing to mechanofusion methods. All mixtures were characterized with respect to physical powder characteristics and resultant solid-state reactivity.

2. Experimental Procedure

Ball milling was done by dispersing powder batches in ethanol. Magnesium stearate disperses well and is slightly soluble in ethanol. Batches were ball milled for 18 to 22 h using zirconia media in polypropylene jars. Powder was separated from media by using excess ethanol to wash the surfaces of the jar and milling media. The slurry was dried, and the resultant soft cakes of material were broken into a fine powder by using a mortar and pestle.

Dry mixing was done using the mechanofusion device illustrated in FIG. 5. The mixing chamber area 6 was loaded with starting batch bulk volumes of 120 to 150 cc, with initial tap densities ranging from 0.5 to 1.0 g/cc. Mechanofusion device 2 was started with a 3 min premixing step at ~350 rpm. During this time, the external heater 12 was used to raise the exterior temperature around the mixing chamber area 6 to ~120° C. The temperature measured inside of the mixing chamber area 6 was ~35° C. at the end of the premixing step.

The rotation speed was then increased to ~1500 rpm and the internal temperature was monitored by means of thermocouple 14 over time. After ~10 min of mixing, the internal temperature reached 85° to 90° C., at which point the external heater 12 was turned off and rotation speed was reduced to ~800 rpm. Mechanofusion continued for another 5 to 10 min while the internal temperature reached a plateau between 100° and 120° C. Some amount of material (~5% of total batch weight) usually was found fused to the fixed piece 10 and scraper 8 and was manually broken up and remixed with the rest of the batch at a lower speed and temperature. During processing, a small amount of material was lost as airborne fines, and a somewhat larger amount was lost in a sleeve (not shown in FIG. 5) between the fixed piece 10 and scraper 8 assembly and lid (also not shown in FIG. 5) of the mixing chamber area 6. The total material recovered from mechanofusion device 2 typically was ~94% of the initial batch weight.

Because of the high weight loss associated with magnesium stearate decomposition, a separate burnout step was done before calcining. Burnout was done using alumina crucibles in a static air atmosphere. The powders first were heated to 300° C. for 2 h, then to 500° C. for an additional 1–2 h. It was difficult to remove all the organic stearate without igniting the samples, and many of the powder batches burst into open flames during a dwell at 300° C. In these cases, the crucibles were removed after the flames burned down, and the remaining ashes were stirred before continuing. After burnout, the resultant material was orange in color with no sign of residual carbon. On removal from crucibles, caked powders were gently broken up with a mortar and pestle, and then were reloaded into covered crucibles and calcined using a heating rate of 300° C./h to 800° or 900° C., with a 3 h dwell time.

3. Characterization

Particle sizes of starting and mixed powders were measured using laser light scattering (Microtrac FRA, Leeds and Northrup Co., Willow Grove, Pa.); morphology was characterized using transmitted-light optical microscopy (Model BHS, Olympus Corp., Lake Success, N.Y.). Both size and shape analyses were done in aqueous dispersions using a surfactant (Witconol NP-100, Witco Corp., New York, N.Y.). Thermal gravimetric analysis (Model TGA-7, Perkin Elmer, Plainfield, N.J.) was used to confirm weight loss on ignition of the stearate powder. Tap densities of the unfired mixtures were calculated by loading a known mass of powder into a 10 ml graduated cylinder, and tapping until the powder reached a stable volume in the cylinder. Relative tap density was calculated by normalizing to the theoretical density for each mixture, taking into account the full mass and volume of all components: lead oxide, niobium pentoxide and various proportions of magnesium carbonate and magnesium stearate. Volume fractions of magnesium stearate for each batch composition are given in Table 1.

X-ray photoelectron spectroscopy (XPS, Model XSAM-800, Kratos, Ramsay, N.J.) was used to examine the near-surface layer elemental composition of mixed powder samples. Samples were irradiated using Mg Kα alpha radiation at 15 keV and 15 Ma. Detection of magnesium was difficult due to the overlap of Mg auger lines with carbon Is background and the low signal to noise ratio of $2s$ and $2p$ lines. Niobium $3s$ lines were also difficult to resolve for most samples examined. Therefore, XPS analysis was performed based on the integrated intensities of lead $4f$, oxygen $1s$ and carbon $1s$ peaks, the photoelectron escape depth for each being on the order of 5 nm from the surface. Atomic concentrations for lead, oxygen and carbon ($C_{Pb}$, $C_O$, $C_C$) were calculated by substituting each element for i in equation 1, where $I_{Pb}$, $I_c$ and $I_o$ are integrated intensities of $Pb4f$, $C1s$ and $O1s$ peaks and $S_{Pb}$, $S_c$ and $S_O$ are known quantification factors. Surface concentrations detected by XPS were compared to bulk atomic concentrations, calculated based on atomic ratios of lead, carbon and oxygen for each mixture.

$$C_i = \frac{100(I_i/S_i)}{(I_{Pb}/S_{Pb}) + (I_c/S_c) + (I_o/S_o)} \quad (1)$$

X-ray powder diffraction (XRD, Model D500, Siemens AG, Karlsruhe, FRG) was used for both qualitative phase identification and quantitative analysis of perovskite yield. Ni filtered Cu Ka radiation was used, produced at 40 kev and 30 Ma. Phase identification was done by scanning appropriate $2q$ ranges with a 0.04° stepwidth for 1 s/step. Results were compared to known patterns in the JCPDS card file using a computer search program (Diffrac-500, Siemens Analytical X-ray Instruments, Inc., Madison, Wis.). Quantitative phase analysis was done by scanning the region from 28° to 33° $2q$ with a stepwidth of 0.02° and calculating integrated peak intensities of perovskite (110), $I_{Pc}$, and pyrochlore (222), $I_{Py}$, using a split-Pearson function. Perovskite yield was calculated by substituting the integrated peak intensities into equation 2; because of the similar mass absorption of the perovskite and pyrochlore phases, the intensity ratio is a good approximation of volume percentage. Ranges of error in perovskite yield shown in Table 1 were calculated for each sample based on standard errors of curve fitting.

$$\text{perovskite yield (vol \%)} = \frac{100 I_{Pe}}{I_{Pe} + I_{Py}} \quad (2)$$

4. Results and Discussion a. Powder Characteristics

A marked difference was observed in mechanofusion depending on whether or not a batch included stearate soap. In general, batches with stearate remained free-flowing during mixing, while batches without stearate formed powder bridges between the fixed piece and scraper (see FIG. 5).

For batches containing the stearate, an audible vibration occurred as the measured internal temperature reached ~90° C., accompanied by a momentary reduction in rotation speed suggesting an increase in frictional drag. Once this vibration/drag onset occurred, the internal temperature would climb quickly if operating conditions were not adjusted by reducing the rotation speed and lowering the external temperature. It should be noted that the measured internal temperature may have differed somewhat from the actual temperature of the batch material due to a lag caused by conduction of heat through the fixed piece to the thermocouple.

Figure 6:
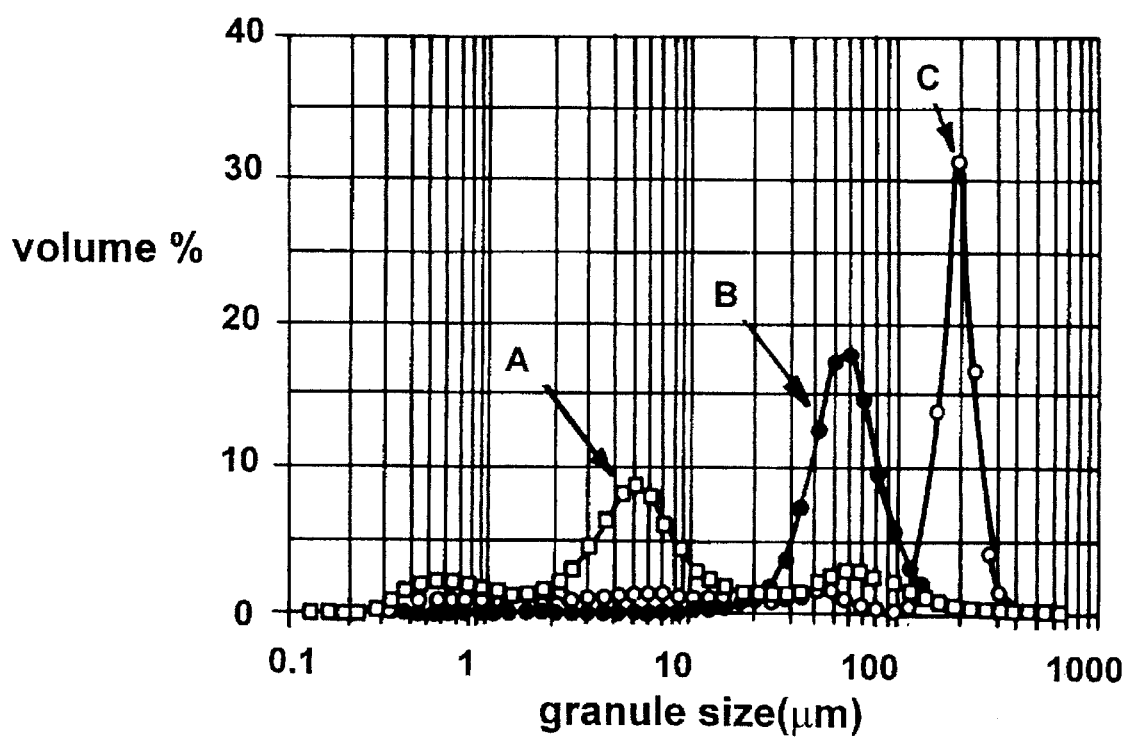
FIG. 6 is a graph showing granule size distribution as a function of stearate content according to the present invention.
Figure 9:
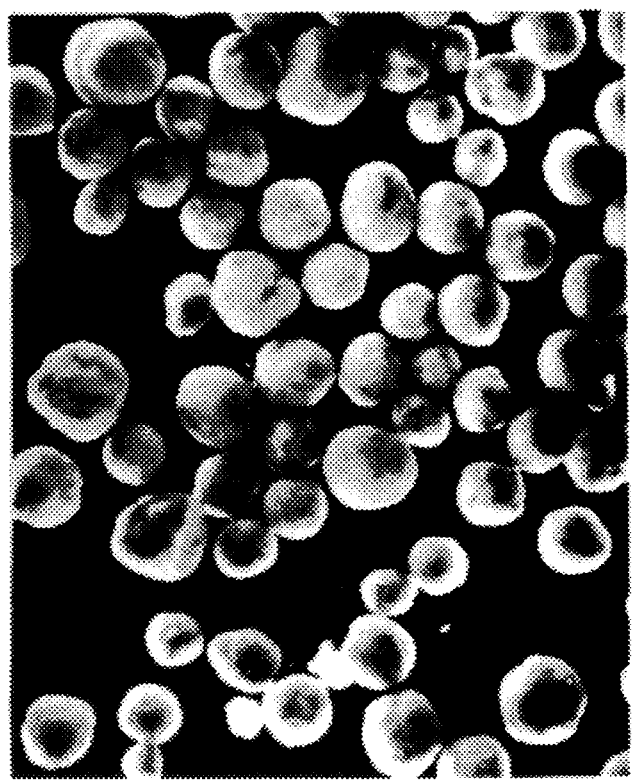
FIG. 9 is a transmitted light optical micrograph (darkfield) showing completed granulation according to the present invention.

The vibration/drag onset appeared to be associated with the softening point of the stearate soap, triggered by the heat to cause particle granulation. In batch runs that were interrupted at points during processing, small samples were removed and characterized with x-ray diffraction and optical microscopy. When the material was sampled before the vibration onset, several diffraction peaks for crystalline magnesium stearate were evident. Material sampled after the vibration onset did not show these stearate peaks, indicating that a transition to an amorphous phase had occurred. When pre-onset powders were dispersed and viewed under the light microscope, particles in the same size range as the starting powders were observed. The pre-onset powders were observed to be highly hydrophobic, indicating that a layer of stearate soap coated the surfaces of all ceramic components rendering them unwettable. After the vibration onset, however, a predominance of larger granules, ~50 microns in diameter, was seen. Resultant powder characteristics such as particle morphology, size distribution, color and tap density also were correlated strongly with the presence of stearate in the batch mixture. When batches containing stearate were dry mixed by mechanofusion, spherical granules with a relatively narrow monomodal log-normal size distribution resulted, as shown in FIGS. 9 and 6. The color of the mechanofused stearate mixtures was a uniform greenish-brown, indicating compositional homogeneity.

In contrast, mechanofusion of batches without stearate resulted in multimodal size distributions consisting of a combination of ungranulated particles and irregularly shaped granules (see FIG. 6). When viewed under an optical microscope, granules made without stearate appeared to be different colors, white or orange, corresponding to the original colors of the component oxides. Thus, mechanofusion without stearate appeared to produce an increased scale of compositional segregation rather than the homogeneous mixing observed with the use of stearate soap.

Tap density also depended on mixing method. For the purpose of comparing different levels of stearate substitution, relative tap densities were based on theoretical densities which included the organic mass and volume of the stearate component. For stearate substitutions of 25, 50 and 100 mol %, ball milling resulted in relative tap densities of ~30%, while the granular material made by mechanofusion showed tap densities of ~55% theoretical. The tap density of the granular material was nearly equal to the maximum density attainable by the random close packing of spheres (64%), indicating a dense intragranule structure.

Figure 7:
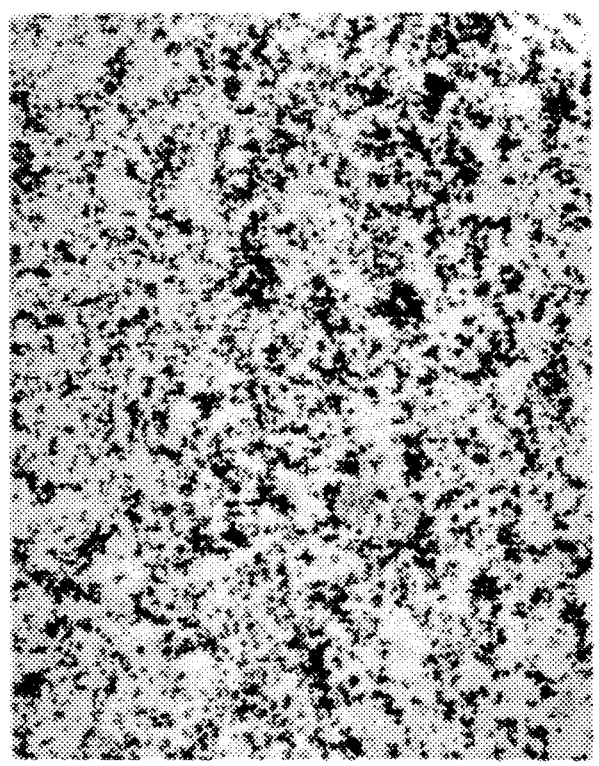
FIG. 7 is a transmitted light optical micrograph (brightfield) of powders following the premixing step according to the present invention.
Figure 8:
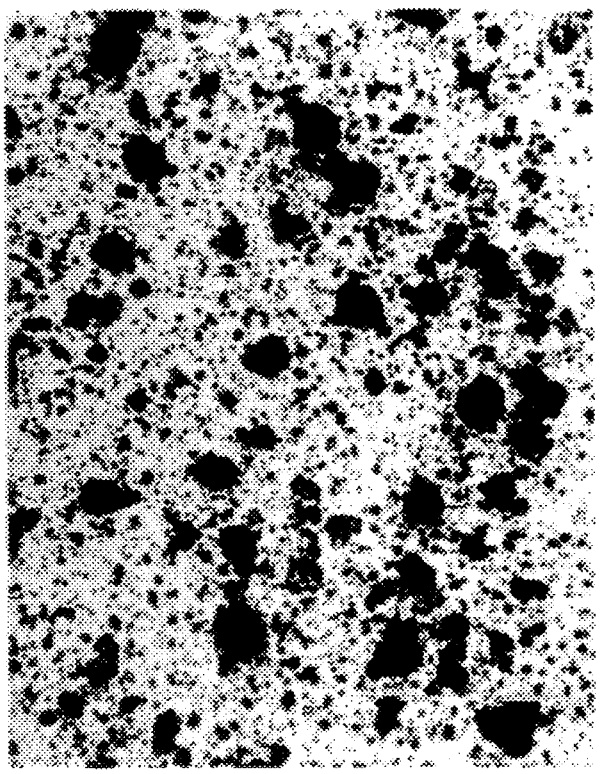
FIG. 8 is another transmitted light optical micrograph (brightfield) showing the onset of the granulation according to the present invention.
Figure 10:
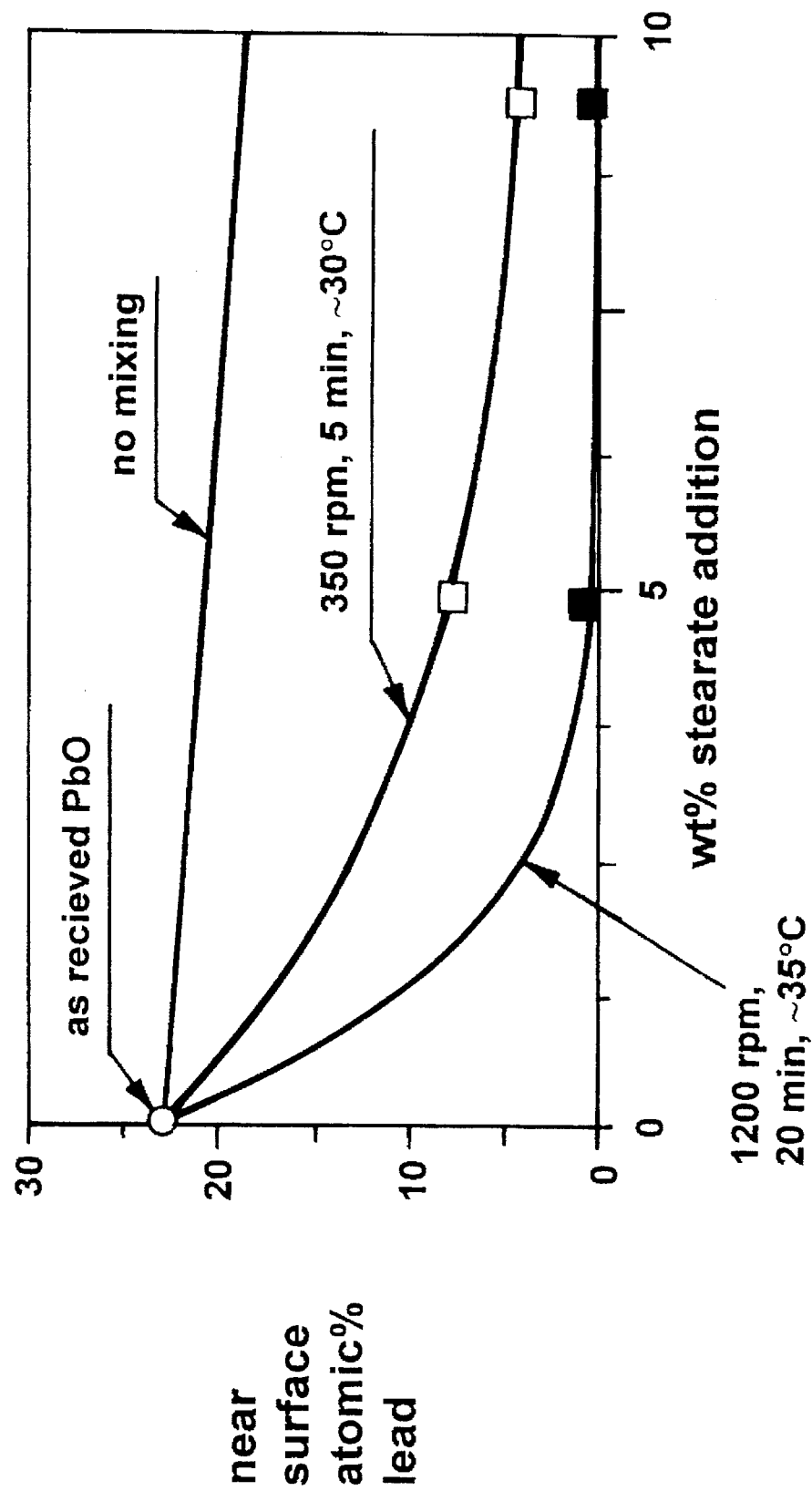
FIG. 10 is a graph showing the particle coating sequence by mechanofusion—occlusion of PbO cores by stearate soap, according to the present invention.

The mechanism for multicore microcapsule synthesis is evident as per optical microscopy and x-ray photoelectron spectroscopy (XPS). Photomicrographs in FIGS. 7, 8, and 9 show how the chronological process of granule formation and indicate when granulation occurs. If XPS is performed on samples prior to and after granulation, significant differences can be observed with respect to the intensity of the various signals emanating from various elemental species in the near surface region of the powder. Monitoring lead $4f$ electrons, the surface concentration of lead can be observed to decrease as the mixer speed increases (FIG. 10) at conditions where granulation is known not to occur. This decrease indicates that the lead oxide particles are being coated progressively. The lead signal is also independent of the concentration of magnesium stearate at mole percentage substitutions for magnesium carbonate of 5 mol % or greater. This is an indication that a uniform thickness of magnesium stearate has been deposited on the lead oxide particles.

At conditions capable of granulation (1800 rpm, 100° C.), a similar dependence of magnesium stearate concentration on Pb $4f$ signal strength can be observed. There is also a slight but noticeable increase in the lead $4f$ signal intensity. This increase in the lead signal occurs probably because the outer region of the granule is being characterized, which has thinner stearate coatings on the dispersed oxide than what may be in the bulk of the granule due to interparticle and mixer friction.

The chemical and physical characterizations suggest that mechanofusion with magnesium stearate produced multicored microcapsules with each granule consisting of a random arrangement of ceramic core particles in a continuous matrix of the stearate phase. The stearate soap played several roles crucial to the assemblage of such a granular structure. First, the stearate acted as a lubricant to facilitate random dispersion and reduce the adhesion of ceramic powders to the fixed pieces of the mechanofusion apparatus. Second, the facile deformation of the stearate soap enabled the coating of the ceramic powders during the initial stage of mechanofusion. Third, as the mixing temperature increased, the stearate coating became more cohesive and acted as a binder for granulation of coated particles. Finally, the lubrication and deformation of the stearate phase during the granulation process aided in the dense packing of coated particles and formation. of spherical granules.

b. Solid-State Reactivity

Several lead niobate pyrochlore phases with compositions between $Pb_3Nb_2O_8$ and $Pb_2Nb_2O_7$ were dominant at 650° C. By 800° C., however, the major phase was perovskite $Pb(Mg_{1/3},Nb_{2/3})O_3$ with pyrochlore $Pb_{1.83}Nb_{1.71}Mg_{0.29}O_{6.39}$ as the minor phase.

Figure 12:
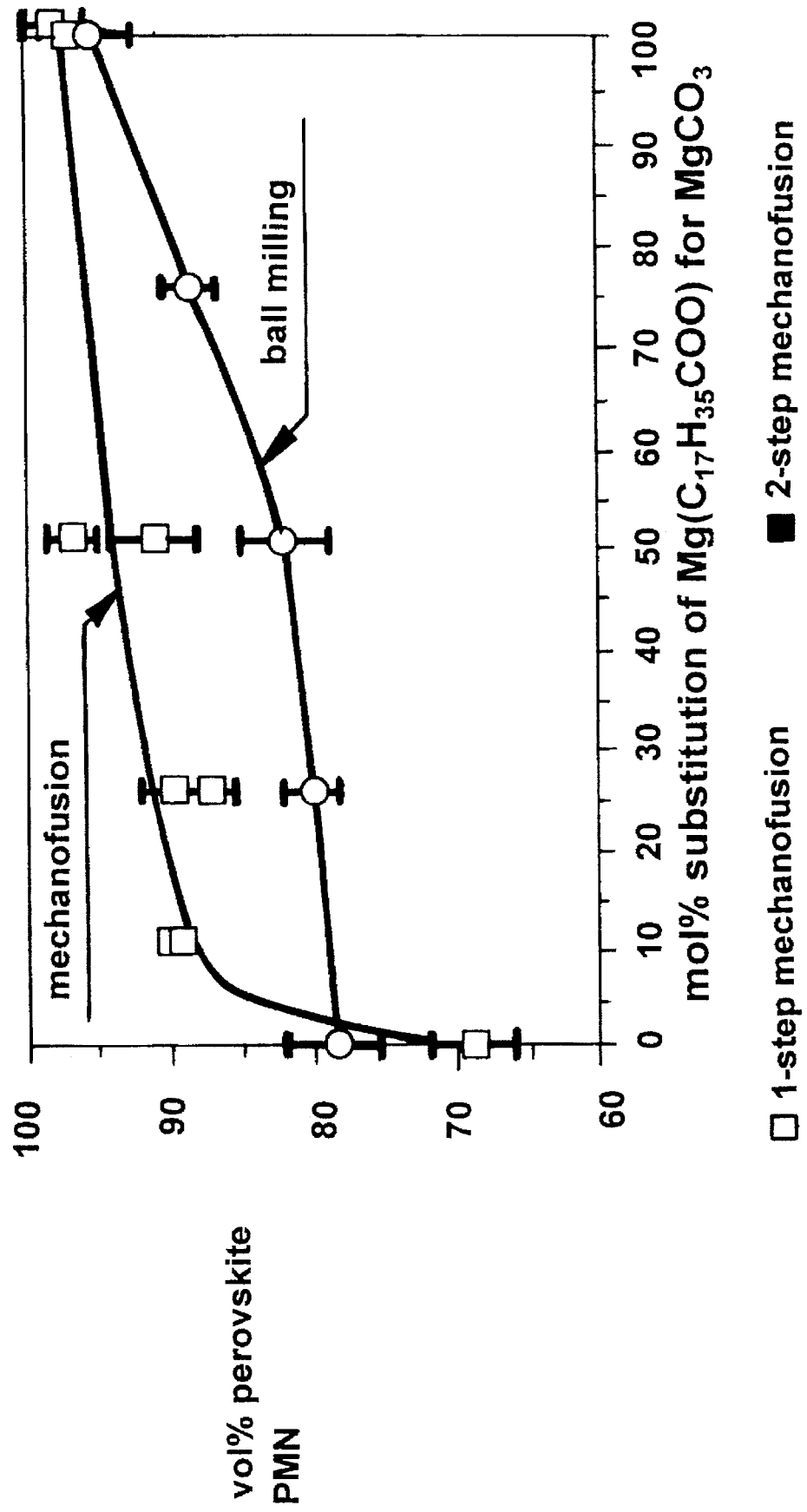
FIG. 12 is a graph showing perovskite yield in the lead magnesium niobate system as a function of stearate substitution and mixing method according to the present invention.

Perovskite yield, on the other hand, was strongly a function of both mixing method and compositional formulation; data are presented in Table 1 and trends for phase development as a function of mixing method and molar percent substitution of magnesium stearate are shown in FIG. 12. Conventional ball milling without magnesium stearate yielded ~80 vol % perovskite after calcining at 900° C. for 3 h, showing agreement with previous work. Very little increase in reactivity was achieved by ball milling with 25 to 50% molar substitution of magnesium stearate.

However, substantially increased perovskite yields were obtained at higher stearate percentages. The 95 vol % perovskite yield obtained from a 100% stearate-substituted batch was comparable to the highest yields achieved by mechanofusion.

Perovskite yields for batches dry mixed by mechanofusion were strongly dependent on whether or not stearate was included, as shown in FIG. 12. Dry mixtures without stearate produced perovskite yields of less than 70 vol %; this low figure was attributed to heterogeneous granulation and compositional segregation of the component powders, as described earlier. In sharp contrast, batches that included magnesium stearate showed substantially higher reactivity. With only 10 mol % substitution of magnesium stearate, perovskite yields of nearly 90 vol % were attained with 3 h calcination at 900° C.; and 91 to 98 vol % yields were obtained for 50 to 100 mol % substitutions. As shown in FIG. 12, some variability in perovskite yield was observed among these mixtures; however, these variations could not be attributed to any specific set of factors.

Nevertheless, perovskite yields achieved by mechanofusion at partial magnesium stearate substitutions were consistently higher than those achieved by ball milling. The higher reactivity of the partially substituted mechanofusion batches indicated that the magnesium carbonate component was more reactive in the granulated mixtures compared to ball milled mixtures.

The magnesium stearate precursor resulted in higher perovskite yields because of its higher chemical activity compared to oxide and carbonate precursors and its microencapsulation of lead oxide and niobium pentoxide particles, regardless of mixing method. The phase yield results of ball milling and mechanofusion were very similar at 100% magnesium stearate substitution (i.e., a 3-component mixture). However, when magnesium stearate was only partially substituted for magnesium carbonate (i.e., a 4-component mixture), reactivity depended on the physical characteristics of the mixtures. In contrast to the coated particles produced by ball milling, the more highly reactive multicore microcapsules produced by mechanofusion exhibited a densely packed granular microstructure. The dense intragranule structure implies a more intimate contact between components and a further reduction in segregation scale. Thus, the formation of multicore microcapsules was an additional factor in enhancing reactivity; the importance of which increased with the number of components in the multicomponent mixture.

5. Conclusions From Experiment

Microencapsulation of ceramic powders with a metalorganic stearate soap was achieved by mixing dry powders in a high shear mixer at controlled temperatures (i.e., mechanofusion). The magnesium stearate soap served several functions crucial to the microencapsulation process, including internal and external lubrication, surface coating of ceramic particles, acting as a binder for granulation and as a reactive precursor material. The result was the formation of dense granules in which ceramic particles were coated in a matrix of a metalorganic component (i.e., multicore microcapsules). Conventional wet ball milling with magnesium stearate also resulted in particle coating, but did not produce granulation. When the stearate was used as the sole source of magnesium in PMN, both ball milling and mechanofusion processes resulted in high perovskite yields. However, when magnesium stearate was only partially substituted for the magnesium carbonate precursor, only mechanofusion resulted in substantially higher perovskite yields. Thus, increased reactivity was attributed to particle coating by the stearate component and the formation of densely packed multicore microcapsules. The effect of multicore microencapsulation on reactivity appears to increase with the number of components in the multicomponent mixture.

C. Additional Process Steps and Composition Examples According to the Present Invention Applications for this invention include many types of materials processing including ceramic, glass, metal, and polymer materials and composites thereof as the final product. This also includes more traditional microencapsulation applications such as making controlled release of drugs and insecticides.

Other applications of the invention are based using the microcapsule structure as a means of controlling the distribution of components for subsequent processing steps. For these applications, the distribution of components and density packing within the microcapsule structure is of essential importance. Examples include facilitating solid state reactions involving multiple components, distribution of components within a composite structure, and distribution of components which aid in the densification of a material. These examples cover many different types of core materials, including ceramics, metals, polymers, glasses and composites thereof.

This section will describe processes and compositions useful for the invention in terms of (1) as-microencapsulated granules and (2) thermal processing of granules.

1. Utilization of Microencapsulated Granules

This section demonstrates various chemistries and granular structures can lead to the preparation of powders useful for a variety of different applications a. Forming Methods

The microencapsulation process of the present invention results in extremely flowable powders that exhibit high tap densities; both are desirable handling properties for a wide range of industrial powder processing applications including structural and electronic ceramic manufacturing. Microcapsule morphology shows a high degree of sphericity and a narrow size distribution. The observed tap densities of nearly 60% of the theoretical density of the combined materials are close to ideal random close packing for monodisperse spheres.

Microstructurally, as determined by electron microscopy, the internal microcapsule structure appears quite dense with little observable porosity. These characteristics are useful for consolidation processes such as dry pressing.

Microencapsulated powders exhibit excellent compaction behavior when dry pressed. The flowability and high tap density of the material aids in die filing. The discrete coating of core particles within the microcapsules facilitates their rearrangement during the granule deformation stage of dry pressing, resulting in excellent microstructural densification of the unfired compact. Furthermore, discrete coating offers binding properties, which facilitate ejection from the die and subsequent handling.

For shaped articles, oxides such as aluminum oxide can be granulated with stearic acid to form 100–200 μm granules useful for cold forming methods such as dry pressing or isostatic pressing. A volume fraction of 8–17 vol % stearic acid should be sufficient to impart granule flow properties, lubricating and binding properties to the formed shape. Upon consideration of the granules to a shaped part, the stearic acid can be pyrolyzed leaving behind a microstructure of aluminum oxide, which can sinter to full density when subjected to high temperature processing. Thus, in this example, the triggerable facilitator serves the functions of microencapsulant, granulator, lubricant, and binder.

Oxides such as aluminum oxide can be granulated with stearic acid to form 100–200 μm granules useful for hot forming methods such as injection molding. For this process, a volume percentage of stearic acid on the order of 50 volume percent would be employed. The granules would exhibit excellent flow properties at room temperature for filling into the injection molding chamber. This organic phase when heated, would impart fluidity and lubrication so that the mixture can be successfully injected into the cold die for solidification of the shaped form. At this stage, the organic phase imparts mechanical strength for handling by acting as a binder. Upon fabrication of the shaped part, the stearic acid can be pyrolyzed leaving behind a microstructure of aluminum oxide, which can sinter to full density when subjected to high temperature processing. Thus, in this example, the triggerable facilitator serves the function of microencapsulant, granulator, lubricant, flow vehicle, and binder.

In all of these examples, metal organic, organometallic or possible inorganic compounds acting as a triggerable facilitator can be employed so that a pyrolysis residue can form. This residue can serve many different functions as outlined in other examples cited in this document.

Other forming methods can utilize microencapsulated granules. Various additional cold forming methods include roll forming and more specific methods of dry and isostatic pressing. Hot forming methods include warm pressing and calendaring.

b. Controlled Reagent Delivery Applications

The invention can be extended to other applications where controlled dosage of solution or vapor phase species is important. For instance, a controlled release aspirin (salicylic acid acetate) can be prepared with the invention. Silica can be microencapsulated with 8–30 wt % aspirin as the triggerable facilitator to form 100–200 μm granules. These granules can be consolidated to form a dense pellet whose porosity can be controlled to moderate dissolution of the aspirin. In addition, the particle size of the silica can be controlled to moderate dissolution. To further moderate dissolution, other organic components can be blended in during the microencapsulation step such as microcrystalline cellulose, polyethylene glycol or starch in the proportions necessary to optimize dissolution.

Alternatively, silica microencapsulated with aspirin could be used as a granule core that can be subsequently encrusted with a granule cladding of silica microencapsulated with polyethylene glycol. In this case, the crust of polyethylene glycol can be used to delay the dissolution of the aspirin.

This invention could be extended to examples where the dissolution is controlled by dissolution of the core particles rather than the microencapsulated phase. In this case it is important the core particle (pharmaceutical) not act as a triggerable facilitator during the microencapsulation process.

For instance, a sublimable insecticide can be microencapsulated into granules and consolidated into compacts where controlled release of the vapor is important. For instance, naphthalene can be used to prepare microencapsulated silica granules that can be consolidated to form cake used to repel moths. Alternatively, fertilizer can be microencapsulated with a water soluble encapsulant into granules that can be applied to soil by conventional means due to its flowability with minimal dusting. Upon contact with moist soil, dissolution of the microencapsulant will mediate the dissolution of the core fertilizer particles. Thus, nitrates and phosphates of potassiun can be microencapsulated with 10–20 wt % polyethylene glycol or wax to prepare 100–200 μm granules that can be useful for this purpose.

c. Polymer-Based Composites

Other types of materials, such as polymer-polymer, polymer-ceramic or polymer-metal composites, may be mixed using the invention. For instance, magnetic barium ferrite can be microencapsulated by polyethylene glycol to prepare granules that can be formed into polymer-ceramic composite shapes for use as hard magnets. Lead zirconate titanate powder can be microencapsulated with (poly) vinylidene difluoride (PVDF) to prepare granules that can be consolidated to form piezoelectric 0-3 composites. Ferromagnetic Fe metal can be microencapsulated into granules with (poly)ethylene glycol and subsequently consolidated to prepare polymer metal composites that are metal based magnets. Teflon™ powder can be microencapsulated with polyethylene glycol to prepare polymer-polymer composites that exhibit fracture toughness.

These products may involve subsequent reaction steps other than pyrolysis of the facilitator. For instance, the facilitator could be synthesized to allow for curing with ultraviolet light or other such reactions to prepare granules that can be consolidated to form monolithic components that are chemically polymerized.

d. Environmental Health and Safety

Improved powder handling properties, discussed above, carry health and safety benefits to those working with powers. Powders that have been preprocessed by microencapsulation are much less susceptible to atmospheric dispersion. As such, the microencapsulation technique offers potential benefits for respiratory health and safety.

In cases where hazardous or poisonous materials are being used (e.g., lead, barium, and bismuth oxides, which are used in electronic ceramics), the particle coating aspect of the microencapsulation technique offers other potential health and safety benefits. By designing the microcapsule with the hazardous material as the core and a nonhazardous component as the coating phase, a physical barrier is formed around the hazardous component. Research has shown that coatings of zinc or magnesium stearate around a lead oxide core result in −75% reduction of lead leachate in acids with PH>2.2. Thus, preprocessing of hazardous raw materials by microencapsulation may reduce the risks of hazardous exposure to subsequent handlers of the material.

2. Thermal Processing

Microencapsulated granules can be thermally processed to yield a myriad of different types of products. Thermolysis can occur via a variety of instrumentation including but not limited to fluidized beds, rotary calciners, periodic and continuous furnaces. Nonconventional heating sources such as microwaves, lasers and plasmas can also be employed. The chemistry of the granules and their method of assemblage along with processing atmosphere determines the types of materials that can result. The following examples demonstrate the spectrum of possibilities.

a. Pyrolysis

The simplest example of pyrolysis would involve the granulated alumina described in section C.1.a. In this case, pyrolysis in air should render the granules porous with minimal sintering at contacts between particles.

Figure 11:
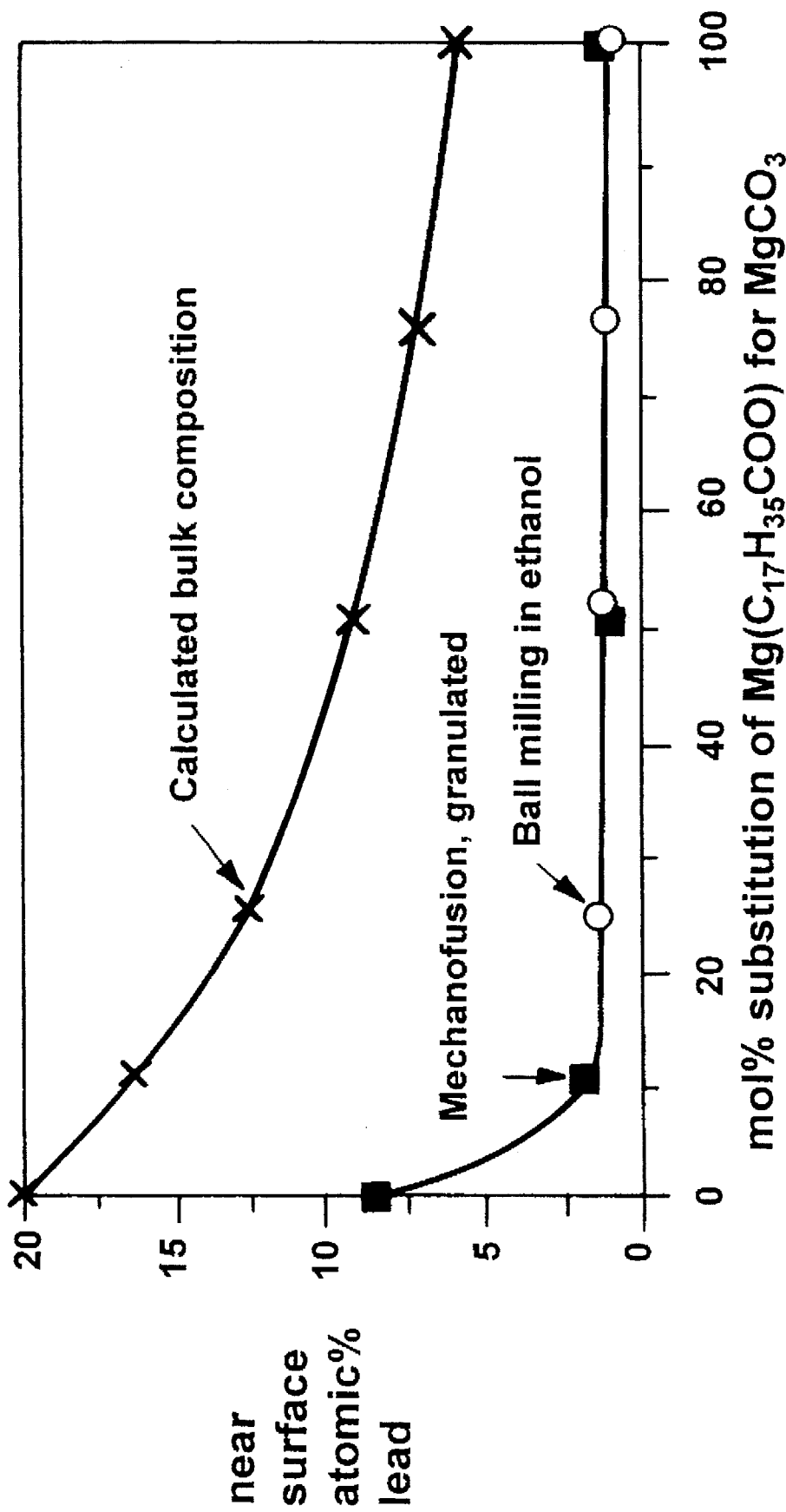
FIG. 11 is a graph showing particle coating as a function of mixing method and mole present stearate substitution according to the present invention.

Another potential application that would utilize the hierarchial structuring ability of the invention, is for the synthesis of catalyst powder. It is desirable to have granules that maintain high permeability of the fluid phase with the catalyst surface. For diffusion rate limited reactions using heterogeneous catalysis, it is desirable to concentrate active catalysis sites on the surface of the spherical granule rather than throughout the granule. Otherwise specific areas of the granule would be less if not inaccessible to the flowing fluid. This serves to conserve the amount of catalyst, which is usually an expensive precious metal. In this application, pellets may be assembled by starting with a core of non-catalytic material (e.g., a multicore microcapsule composed of powdered silica bound by a sodium stearate), to which is added a crust layer (i.e., FIGS. 10 and 11) of a catalytically active powder (e,g., Pd-coated zirconia) microencapsulated in a second triggerable facilitator (e.g., stearic acid). The structure is then pyrolyzed to yield a granule in which the active catalytic sites are located in the crust layer. The useful product is the hierarchically-structured catalyst granule, which is useful for catalytic oxidation of carbon monoxide for automobile applications.

In situations where the catalysis cost is not a factor, high permeability and high surface activity can be maintained with the invention. For instance, 20–30 μm zinc oxide can microencapsulated with zinc stearate to prepare granules that can be pyrolyzed to form a porous spherical granule (pellet) that consists of fine zinc oxide (<0.1 μm) particles on coarse zinc oxide particles. Such a granule can be used for photocatalytic oxidation of hydrocarbons.

Alternatively, rather than using the same compound for the support, the catalyst can differ in composition from that of the support. Thus, a zinc oxide catalyst can be prepared by microencapsulation of zirconium oxide with zinc stearate to prepare spherical granule (pellet) that consists of fine zinc oxide (<0.1 μm) on a support of zirconium oxide. Such a granule can be used for photocatalytic oxidation of hydrocarbons.

b. Nonoxides

Oxides can microencapsulated with the stearate to form granules that can be pyrolyzed in argon or nitrogen to form nonoxide ceramics. This occurs by virtue of the fact that carbon precipitation occurs in these atmospheres, which is useful for carbothermal reduction. For instance, alumina can be microencapsulated with aluminum stearate to form granules that can by pyrolyzed in nitrogen to form aluminum nitride. Silica can microencapsulated with stearic acid to form granules that can be pyrolyzed in argon to form silicon carbide. In addition, nonoxide powders microencapsulated in organometallic, organic or metal organic soaps to form granules that are subsequently pyrolyzed can use residual carbon generated from argon or nitrogen pyrolysis to remove residual oxygen from the nonoxide powders. This can be useful for the preparation of silicon carbide or silicon nitride ceramics with low oxygen contents.

c. Redox Chemistry

The stearate microencapsulant offers a supply of carbon that is also useful for achieving different oxidation states by virtue of the reductive interaction between carbon and various transition metals. Titania can be reduced to form a material with mixed Ti+3 and Ti+4 valence states. This could be accomplished by (1) microencapsulation of titania with a quantity of stearic acid (<10 wt %) sufficient for granulation but not for carbothermal reduction and (2) ignition of the granules in a stagnant air environment.

d. Oxide Composites

Composites represent a class of materials of which the invention is applicable. Recent examples in the prior art have shown increasing interest in forming coated particles which are then formed into a compact and sintered such that the coating material becomes the matrix phase of a particulate composite structure. The invention offers an improved method for achieving highly ordered mixtures of particulate in a matrix phase. The pyrolysis of the organic component of the triggerable facilitator (coating phase) and subsequent sintering result in a composite in which the core particles are surrounded by a matrix of the pyrolysis product.

Several types of composites can be prepared with this method. First, zirconia powder can be microencapsulated with aluminum stearate (8–50 wt %) to a produce an alumina/zirconia composite. Additions of alumina can be introduced as well to add a bimodal distribution of alumina grains. A composite consisting of alumina and titania, or a mixture of aluminum titanate and alumina and/or titania phases can be prepared by the microencapsulation of titania and optionally alumina by an aluminum stearate (8–50 wt %) and subsequent pyrolysis and solid state reaction of the granules. Choice of the processing temperature will determine whether the composite will or will not react to form aluminum titanate. Furthermore, choice of the stoichiometry of aluminum compounds to zirconia will determine the proportion of excess single component oxide phases (titania or zirconia) that result.

e. Carbothermal Composites

Carbothermal reduction represents another class of reactions for which the invention can be used as a vehicle for precursor mixing, as well as providing the carbon fuel for a decomposition reaction. In this case, the reaction atmosphere must be controlled such that the pyrolysis of the organic part of the triggerable facilitator (e.g., stearate ligand) causes the reduction of an oxide particle precursor. For example, for a system in which silica is microencapsulated by aluminum stearate, the pyrolysis of the stearate in a nitrogen atmosphere can reduce the silica to form silicon carbide, while the aluminum undergoes a reaction with the atmospheric nitrogen to form aluminum nitride. The product of this example is a composite structure of silicon carbide in a finely distributed matrix of aluminum nitride.

f. Cermets (Ceramic/metal Composites)

Ceramic-metal composites (ceramets) can be prepared by microencapsulation of tungsten metal with cobalt stearate. In this case, pyrolysis of the resultant granules in argon will yield carbon residue that can be used to react with tungsten to form tungsten carbide and carbon monoxide gas to reduce cobalt to the metallic state.

g. Multicomponent Ceramics

Solid state reactions for multicomponent ceramics is of key importance to the manufacture of many types of high technology ceramics that include chemical, structural, electrical and refractory applications. Further, there is a need to be able to flexibly alter compositional ratios in order to produce different stoichiometries required by various electronic applications. The microencapsulation process of the present invention offers enhanced reactivity compared to conventional processing and more compositional flexibility compared to chemical synthesis methods. In the microencapsulation process, components can be included either as cores or as coating phases. As such, specific mixing order of components can be used as a control parameter for solid state reactivity. In this case, specific mixing order serves to encourage the prereaction of specific components without the need for additional solid state reaction process steps.

The invention can increase solid-state reactivity in a multicomponent mixture compared to conventional mixing processes. Reactivity is enhanced by the fine-scale mixing of the triggerable granule facilitator having a reactive component, for example, a metal-organic soap cladding over a ceramic particle core, which results in a much shorter mean diffusion distance for the soap cations, when compared to conventional mixing methods for ceramic powders.

Further, microencapsulation of multicomponent core particles can produce ordered mixing (i.e., core A and core B both form physical interfaces with the coating phase C, but there is no direct A-B interface). This type of mixing order can be used to promote reaction intermediates between the coating an core phases, while limiting the reaction between the dissimilar cores. More elaborate ordering is possible by mixing different components in separate stages (i.e., coat powder A with soap C, coat ceramic powder B with soap D, then mix together and microencapsulate to form A-C, B-D and C-D interfaces.)

An example of limiting the reaction between dissimilar cores is illustrated in the lead magnesium niobate example cited earlier. In this case, magnesium stearate microencapsulant was used to separate lead oxide and niobium pentoxide particles in the form of multicore microcapsule granules. Thus, when the granules were pyrolyzed, the solid state chemistry that could take place between lead oxide and niobium pentoxide at high temperature was minimized by the magnesium stearate pyrolysis product.

The solid state reaction of multicomponent ceramic mixtures for electronic ceramics is an important area for application of the invention. There are many different ceramic compositions used for electronic applications which can be made by using the invention as a vehicle for controlled mixing of precursors. Examples include the lead-based relaxor ferroelectric materials that have been mentioned in conjunction with the specific research leading to this invention (e.g., lead magnesium niobate formed by the calcination of lead and niobium oxide powders microencapsulated in magnesium stearate) as well as other electronic compositions such as titanate and zirconate compounds. For example, the invention could be used to form microcapsules of titania with barium stearate, then reacted to form barium titanate; or zirconia microencapsulated by strontium stearate, reacted to form strontium zirconate. Further, the invention is very useful in assembling a wide variety of more complex mixtures that are required for specific electronic specifications (e.g., PMN-PZN-ST, a solid solution of lead magnesium niobate, lead zinc niobate and strontium titanate).

Granules with a granular cladding that differs from the granular core structure (FIG. 4) may have use in nuclear fuel applications where control of the fission process is essential. In this case, uranium oxide can be microencapsulated with stearic acid (10–20 vol %). The microcapsules can be combined with a secondary crust by the addition of beryllium oxide microencapsulated with aluminum stearate. Upon pyrolysis, the fissionable fuel is encapsulated in a layer of ceramic that is refractory, highly thermally conductive and limits the extent to which fission chain reactions occur.

Other examples of multicomponent ceramics include partially stabilized zirconia, which is used for structural applications. In this case, magnesia, calcia or yttria additions are used. The invention can be used to prepare such materials. Zirconia can be microencapsulated by a magnesium soap to form granules that can be pyrolyzed to form a zirconia that is partially stabilized in the tetragonal and monoclinic phase. Alternatively, silica can be microencapsulated by magnesium stearate to prepare granules that can be pyrolyzed at high temperature to form the magnesium silicate known as mullite; another useful structural ceramic material.

Powder granules can be consolidated to a shaped form prior to thermal processing. Upon firing, the multicomponent phrase can form in the consolidated state rather than in the granular form. In this case both forming, solid state reaction and densification can be controlled as a consequence of the present invention.

h. Metal Alloys

Possibilities for the application of the invention to the synthesis of metal systems include examples such as the formation of martensitic steel, in which iron powder is encapsulated by a manganese soap, which is then pyrolyzed in a reducing atmosphere to leave a fine distribution of manganese and carbon coating the particulate of iron. The reaction of these components can then be done to produce a martensitic steel.

i. Glasses

Processing with such a finely controlled distribution of fluxing agents also facilitates the processing of glass. In this case, lithium silicate fast ion conducting material can be prepared by microencapsulation of silica glass powder with lithium stearate to prepare granules that can be reacted at high temperature to form lithium silicate glass via diffusion and viscous sintering. Crystallizable glasses useful for glass ceramics can also be prepared by proper choice of the microencapsulating triggerable facilitator. In this case, aluminosilicate glass powders can be microencapsulated with a stearate soap of lithium or magnesium to prepare granules that can be reacted at high temperature to form uniform glasses such as lithium aluminosilicate (AS) or magnesium aluminosilicate (MAS) glasses respectively. These glasses can be annealed to crystallize phases (e.g., beta-eucryptite) useful for the preparation of glass ceramics that have appealing properties such as low thermal expansion and low dielectric constant.

j. Densification Aids

Achieving high density in a product piece is essential to the processing of many advanced ceramic compositions. Densification is a difficult problem, particularly for nonoxides such as aluminum nitride and silicon carbide, and high melting-point oxides such as alumina. In order to improve the rate of densification at lower processing temperatures, sintering aids are introduced. The invention is applicable in that it provides the ability to apply a coating of the sintering aid component around the ceramic particles, thus optimizing the effectiveness of the sintering aid. For example, silicon nitride can be microencapsulated with stearates of magnesium, aluminum or yttria to effect the liquid phase sintering of silicon nitride. As mentioned in section C.2.b., the carbon residue resulting from the pyrolysis can be used to carbothermally remove oxygen from both the nonoxide and the sintering aid(s). Aluminum oxide can be microencapsulated with magnesium stearate to effectively introduce magnesia as a sintering aid.

Microencapsulated granules can also be used to induce densification for traditional ceramics. Traditional ceramics densify by a process known as vitrification whereby fluxing agents for liquid silicate phase whose surface tension and infiltration through the powder bed densifies the powder body by the formation of a continuous glass phase with controlled porosity. Alkalies and alkaline earth species are typical fluxing agents. Thus, by microencapsulation of clay, feldspar and silica particles by soaps of sodium, potassium, lithium, calcium, granules can be formed, dry pressed, pyrolyzed and vitrified to a fired body of controlled porosity. This process should yield pieces with more uniform properties such as porosity, density, thermal expansion, and refractoriness than what conventional processing of mineral would yield.

D. Additional Method Steps and Compositions for Unit Operations

1. Solid-state Reactivity

Solid state reactivity of multicomponent mixtures is of key importance to the manufacture of many high technology ceramics, especially for electronic applications.

Elimination of the hydrocarbon content by pyrolysis (also known as "burnout") of the metalorganic soap during firing is another process control factor. Normally, burnout is viewed as a problem in ceramic processing; however, under the present invention the microencapsulation process adds an element of control to the redox chemistry during and subsequent to burnout. As such, the process may be used to advantage in controlling redox reactions without using controlled atmosphere furnaces. The degree of local reduction and the subsequent re-oxidation in an ambient air atmosphere can be controlled by the organic chemistry of the soap, the weight ratio of the soap in the overall mixture, the heating rate and the size of the multicore microcapsules.

E. Additional Method Steps and Compositions for Addition of Sintering Aids or Fluxes to Ceramic Powders The coating of a primary material with a fluxing agent or sintering aid has applications in both electronic and structural ceramics. Advanced structural ceramic powders such as silicon and aluminum nitrides can be processed by incorporating sintering aids according to the present invention. More simply, though, the invention also can be relatively economical with respect to more traditional ceramic processing of refractories, insulators, etc.

1. Preparation of Ceramic Powders for Dry Pressing

Dry powder pressing is an important forming method used for both electronic and structural ceramics. The microcapsule structure provides an even distribution of the coating on the ceramic particles within the granule. This assists the rearrangement of particles within the granule and benefits compaction during dry pressing. Microcapsules produced by the invention also exhibit excellent flowability which is important for effective die filling before pressing.

2. Preparation of Ceramic Powders for Injection Molding

The invention enables the mixture of large volume fractions of metalorganics with ceramic powders. This may be a benefit for injection molding of structural ceramics.

F. Additional Method Steps and Compositions for Preparation of Composite Powders by Carbo-thermal Reduction/oxidation of Multicomponent Mixtures Composite ceramic particles can be formed by the mixture of metal powders with ceramic oxides and carbon. Heating of such mixtures can cause oxidation of the metal species and carbo-thermal reduction of the oxides to form carbide ceramics. The present invention offers a way to coat the metal and oxide particles with an metalorganic component, which is a source of carbon. This technique leads to a more controllable oxidation/reduction of the coated species.

G. Additional Method Steps and Compositions for Direct Application of Microcapsule Product With respect to the forming of a granular product with a specific structural hierarchy, several applications that have traditionally used microencapsulation to control the release of an active core material include pharmaceuticals, food processing, insecticides and fertilizers. The invention is applicable to any an all such applications where the physical form of the core material is a finely divided solid that is physically harder than the triggerable encapsulant material.

1. Material Examples a. Multicomponent Ceramics: Solid State Reactions

Solid state reaction, as has been mentioned earlier, is often rate-limited by diffusion of reacting species. The invention offers a way to reduce the scale of component segregation in a multicomponent mixture such that solid state reaction rates are increased. Further, the ordered structure of chemical interfaces in a microcapsule structure can be used to control reaction intermediates that can effect product yields. Solid state reaction is common to the processing of many types of ceramics including electronic ceramics, advanced structural ceramics and traditional ceramics.

Mixing of components is of vital importance to processing of traditional ceramics. For example, in order to achieve uniform firing of clay bodies, there must be an even distribution of fluxes. Microencapsulation of clay, feldspar and silica particles by fluxes in the forms of the soaps of sodium, potassium, lithium, calcium, etc. can impart a controlled distribution of fluxing agents. In turn, this yields pieces with more uniform properties such as thermal expansion. Processing with such a finely controlled distribution of fluxing agents also facilitates the processing of glass ceramics, wherein ceramic grains are in a matrix of a glassy phase, the distribution of which is related to the scale of mixing in the microencapsulation process.

b. Densification of Ceramics

Achieving high density in a product piece is essential to the processing of many advanced ceramic compositions. Densification is a difficult problem, particularly for nonoxides such as aluminum nitride and silicon carbide, and high melting-point oxides such as alumina. In order to improve the rate of densification at lower processing temperatures, sintering aids are introduced. The invention is applicable in that it provides the ability to apply a coating of the sintering aid component around the ceramic particles, thus optimizing the effectiveness of the sintering aid. Examples of such systems include silicon nitride particles coated by a sintering aid containing a sources of aluminum, yttria and/or magnesium. The invention could be used to apply such sintering aids complexed with the triggerable facilitator component (e.g., soaps of magnesium, aluminum, etc.).

c. Composite Materials

Composites represent a class of materials to which the invention is applicable. Recent examples in the prior art have shown increasing interest in forming coated particles which are then formed into a compact and sintered such that the coating material becomes the matrix phase of a particulate composite structure. The invention offers an improved method for achieving highly ordered mixtures of particulate in a matrix phase. The pyrolysis of the organic component of the triggerable facilitator (coating phase) and subsequent sintering result in a composite in which the core particles are surrounded by a matrix of the pyrolysis product. An example is the encapsulation of titania by an aluminum soap, which pyrolyzes to form a composite of titania and alumina.

Carbothermal reduction represents another class of reactions for which the invention can be used as a vehicle for precursor mixing, as well as providing the carbon fuel for a decomposition reaction. In this case, the reaction atmosphere must be controlled such that the pyrolysis of the organic part of the triggerable facilitator (e.g., stearate ligand) causes the reduction of an oxide particle precursor. For example, for a system in a which silica is microencapsulated by aluminum stearate, the pyrolysis of the stearate in a nitrogen atmosphere can reduce the silica to form silicon carbide, while the aluminum undergoes a reaction with the atmospheric nitrogen to form aluminum nitride. The product of this example is a composite structure of silicon carbide in a finely distributed matrix of aluminum nitride.

Other types of materials, such as polymer-polymer, polymer-ceramic or polymer-metal composites, may be mixed using the invention. These products may involve subsequent reaction steps other than pyrolysis of the facilitator. For instance, the facilitator could be synthesized to allow for curing with ultraviolet light or other such reaction. Examples of such applications include the synthesis of piezoelectric composites in which a piezoelectric ceramic phase in encapsulated in a matrix of a polymer such as polyvinylidenedifluoride (PVDF).

2. Forming Processes

In regards to the above mentioned processes for synthesis of various materials, the invention may also be applied to the forming of such materials into useful shapes before the pyrolysis, calcination or other such reaction is initiated. There are several reasons why microcapsule structure provides an excellent morphology for forming operations. First, the granular size, on the order of 100 μm, and spherical morphology provide for excellent flowability of the granular material, which is important for good die filling and reproducible forming operations. Secondly, the finely distributed encapsulation phase acts as an internal lubricant for dry pressing operations. Also, in the case of the injection molding, a high loading percentage of the organic phase can be achieved using the invention. Applicable forming methods include wet and dry bag isostatic pressing, various types of uniaxial dry pressing, calendaring, and injection molding.

a. Pelletization for Heterogeneous Catalyst Support

Another potential application which would utilize the hierarchical structuring ability of the invention is the forming of catalyst pellets. For diffusion rate-limited reactions using heterogeneous catalysis, it is desirable to concentrate active catalyst sites on the near-surface crust layer of a spherical pellet. In this application, pellets may be assembled by starting with a granular core of non-catalytic material (e.g., a multicore microcapsule composed of powdered silica bound by a sodium stearate flux), to which is added a granular cladding (i.e., FIG. 4) of a catalytically active powder encapsulated in a second triggerable facilitator. The structure is then pyrolyzed to yield granules in which the active catalyst sites are located in the granular cladding. The useful product is the hierarchically-structured catalyst pellet.

b. Preparation of Nuclear Fuel Pellets

Recent advances in nuclear fuel technology and reaction design have focused on small coated pellets (~1 microns dia.) of enriched uranium as fuel cell units, wherein the granule core is rich in uranium fuel and the granule crust is an insulating layer. This pellet structure limits the extent to which chain reactions can proceed. Production of such fuel pellets is another application of the present invention. In this case, uranium oxide can microencapsulated with stearic acid (10–20 vol %). The microcapsules can be combined with a granular cladding by the addition of beryllium oxide microencapsulated with aluminum stearate. Upon pyrolysis, the fissionable fuel is encapsulated in a granular cladding of ceramic that is refractory and highly thermally conductive.

SUMMARY

While this invention has been particularly shown and described with reference to a preferred embodiment, it will be readily appreciated by those of ordinary skill in the art that various changes and modifications may be made without departing from the spirit or scope of the invention. For example, the particular facilitators and cores herein described may be modified, as desired. Likewise, the present invention should not be limited to the specific examples described herein because the generalizability of the process is an important feature of this invention. It is therefore, contemplated that the appended claims be interpreted as including the foregoing as examples.

We claim:

1. A method for controlling chemical distribution of dry substances, the method comprising the steps of:

(a) dry mixing particles of a first powder and a triggerable granule facilitator to form first microcapsules, the first microcapsules each having a core of one of the particles and a coating of the facilitator;

(b) further dry mixing at a speed sufficient to cause increased frictional interaction between the microcapsules, thereby triggering the facilitator while dry mixing the microcapsules to form granules of the microcapsules by an aggregation process; and (c) ceasing the dry mixing while maintaining the granules of the microcapsules in a dry phase.

2. The method of claim 1, further comprising the step of:

forming an undercoating on each of said first particles so that the triggerable granule facilitator forms a second coating of the first particles.

3. The method of claim 2, further comprising the steps of:

mixing particles of a second powder with the facilitator to form second microcapsules, the second microcapsules each having a core of one of the particles of the second powder and a coating of the facilitator; and mixing the first and the second microcapsules prior to said triggering step so that the triggering step will form the granules from a random distribution of the first and second microcapsules.

4. The method of claim 1, further comprising the steps of:

mixing particles of a second powder with the facilitator to form second microcapsules, the second microcapsules each having a core of one of the particles of the second powder and a coating of the facilitator; and mixing the first and the second microcapsules prior to said triggering step so that the triggering step will form the granules from a random distribution of the first and second microcapsules.

5. The method of claim 1, further comprising the steps of:

mixing particles of a second powder with the facilitator to form second microcapsules, each having a core of one of the particles of the second powder and a coating of the facilitator;

mixing the second microcapsules with the granules; and retriggering said facilitator to form a granular cladding of the second microcapsules on each of the granules.

6. The method of claim 5, further comprising the step of:

first mixing the particles of the first powder and a substance other than the triggerable granule facilitator to form an undercoating on each of said first particles so that the first triggerable granule facilitator forms a second coating of the first particles.

7. The method of claim 5, further comprising the step of:

first mixing the particles of the second powder and a substance other than the granule facilitator to form an undercoating on each of said second particles so that the triggerable granule facilitator forms a second coating of the second particles.

8. The method of claim 1, further comprising the steps of:

mixing particles of a second powder with a second facilitator to form second microcapsules, the second microcapsules each having a core of one of the particles of the second powder and a coating of the second facilitator;

mixing the granules with the second microcapsules; and triggering said second facilitator without triggering said first facilitator to form a granular cladding of the second microcapsules and the second facilitator on each of the granules.

9. The method of claim 8, further comprising the step of:

first mixing the particles of the first powder and a substance other than the triggerable granule facilitator to form an undercoating on each of said first particles so that the first triggerable granule facilitator forms a second coating of the first particles.

10. The method of claim 8, further comprising the step of:

first mixing the particles of the second powder and a substance other than the granule facilitator to form an undercoating on each of said second particles so that the triggerable granule facilitator forms a second coating of the second particles.

11. The method of any one of claims 1-10, wherein the mixing is carried out with a mechanofusion device.

12. The method of any one of claims 1-10, further comprising the step of:

pyrolyzing the microcapsules sufficiently to remove a portion of the facilitator but leave a pyrolysis product, forming a distribution of the pyrolysis product and the particles.

13. The method of any one of claims 1-10, wherein at least some of said mixing is high shear mixing.

14. The method of any one of claims 1, 4, 5, or 8, further comprising the step of:

pyrolyzing the microcapsules sufficiently to remove the facilitator, forming a distribution of the particles.

15. The method of any one of claims 1, 4, 5 or 8, further comprising the step of:

heating the distribution sufficiently to induce mass transport chemical distribution.

16. The method of claim 11, further comprising the step of:

pyrolyzing the microcapsules to leave a pyrolysis product, forming a distribution of the pyrolysis product and the particles.

17. The method of claim 16, further comprising the step of:

heating the distribution of the pyrolysis product and the particles sufficiently to induce a mass transport chemical distribution.

18. The method of claim 17, wherein the step of mixing is carried out with the first facilitator being a metalorganic soap.

19. The method of claim 18, wherein the step of mixing is carried out with the first powder being a ceramic.

20. The method of claim 12, further comprising the step of:

heating the distribution of the pyrolysis product and the particles to induce a mass transport chemical distribution.

21. The method of claim 20, wherein the step of mixing is carried out with the first facilitator being a metalorganic soap.

22. The method of claim 20 wherein the step of mixing is carried out with the first powder being a ceramic.

23. The method of claim 12, further comprising the step of:

inducing a solid state chemical reaction resulting in a phase pure, multicomponent compound.

24. The method of claim 12, wherein the heating step includes heating sufficiently to induce a solid state chemical reaction resulting in a multiphase ensemble of compounds.

25. A method for controlling chemical distribution of substances, the method comprising the steps of:

coating particles of a first powder to form microcapsules;

pyrolyzing the microcapsules in a solid state to leave a resulting pyrolysis product, forming a distribution of the pyrolysis product and the particles; and heating the distribution of the pyrolysis product and the particles to induce mass transport chemical distribution in a solid state.

26. The method of claim 25, wherein the heating step includes:

inducing a solid state chemical reaction resulting in a phase pure, multicomponent compound.

27. The method of claim 25, further comprising the step of inducing a solid state chemical reaction resulting in a multiphase ensemble of compounds.

28. The method of claim 25 wherein the particles are finer than 325 mesh.

29. The method of claim 25 wherein the particles are organic particles.

30. The method of claim 25 wherein the particles are inorganic particles.

31. The method of claim 25, wherein the pyrolysis product is derived from the coating on core particles, not cladding particles, in a multilayer granule.

32. The method of claim 25, wherein the pyrolysis product is derived from the coating on cladding particles, not core particles, in a multilayer granule.

33. The method of claim 25, wherein the step of coating includes the steps of:
   (a) dry mixing particles of a first powder and a triggerable granule facilitator to form first microcapsules, the first microcapsules each having a core of one of the particles and a coating of the facilitator;
   (b) further dry mixing at a speed sufficient to cause increased frictional interaction between the microcapsules, thereby triggering the facilitator while dry mixing the microcapsules to form granules of the microcapsules by an aggregation process; and
   (c) ceasing the dry mixing while maintaining the granules of the microcapsules in a dry phase.

34. A method according to claim 25, wherein the step of coating particles comprises dry coating particles of the first powder to form microcapsules.

35. A method for controlling chemical distribution of substances, the method comprising the steps of:

coating particles of a first powder to form microcapsules;

pyrolyzing the microcapsules to leave a resulting pyrolysis product, forming a distribution of the pyrolysis product and the particles; and heating the distribution of the pyrolysis product and the particles to induce mass transport chemical distribution in a solid state, wherein the coating includes a triggerable granule facilitator which is finer than 325 mesh.

* * * * *